United States Patent [19]
Ishii et al.

[11] Patent Number: 5,535,901
[45] Date of Patent: Jul. 16, 1996

[54] SYNTHETIC RESIN BOTTLE WITH HANDLE AND ITS PRODUCTION METHOD

[75] Inventors: Hiroichi Ishii, Tokyo; Takao Iizuka, Matsudo; Takamitsu Nozawa, Tokyo; Fujio Shioiri, Nasu-gun; Shinji Shimada, Tokyo, all of Japan

[73] Assignee: Yoshino Kogyosho Co., Ltd., Tokyo, Japan

[21] Appl. No.: 367,248

[22] PCT Filed: May 16, 1994

[86] PCT No.: PCT/JP94/00791

§ 371 Date: Feb. 17, 1995

§ 102(e) Date: Feb. 17, 1995

[87] PCT Pub. No.: WO94/26601

PCT Pub. Date: Nov. 24, 1994

[30] Foreign Application Priority Data

| May 17, 1993 | [JP] | Japan | 5-114948 |
| Jul. 2, 1993 | [JP] | Japan | 5-164827 |
| Sep. 24, 1993 | [JP] | Japan | 5-237766 |
| Oct. 29, 1993 | [JP] | Japan | 5-271406 |

[51] Int. Cl.⁶ .................................................. B65D 23/10
[52] U.S. Cl. ........................... 215/396; 215/398; 264/516
[58] Field of Search ......................... 215/396, 397, 215/399, 398; 220/752, 759, 770; D9/549, 559; 264/516, 512, 513, 514

[56] References Cited

U.S. PATENT DOCUMENTS

| 4,363,415 | 12/1982 | Rainville | 215/396 |
| 4,915,241 | 4/1990 | Morimura et al. | 215/398 |
| 4,952,133 | 8/1990 | Hasegawa et al. | 264/516 X |
| 5,092,476 | 3/1992 | Yasuda et al. | 215/398 |
| 5,167,970 | 12/1992 | Yoshino et al. | 215/398 X |
| 5,170,533 | 12/1992 | Barry | 215/396 X |

FOREIGN PATENT DOCUMENTS

| U-63-147429 | 9/1988 | Japan . |
| A-2191156 | 7/1990 | Japan . |
| U-2-99734 | 8/1990 | Japan . |
| A-4-6043 | 1/1992 | Japan . |
| U-4-13536 | 2/1992 | Japan . |
| A-4-71484 | 3/1992 | Japan . |
| U-4-45227 | 4/1992 | Japan . |
| A-4-173548 | 6/1992 | Japan . |
| WO91/16190 | 10/1991 | WIPO . |

*Primary Examiner*—Allan N. Shoap
*Assistant Examiner*—Christopher J. McDonald
*Attorney, Agent, or Firm*—Oliff & Berridge

[57] ABSTRACT

In a bottle made of synthetic resin of the present invention, a handle is combined to a bottle body so that the bottle can be easily handled for carrying it and pouring the content. When the joint of the handle to the bottle body is unstable, it is difficult to handle the bottle and it will occur an accident when the handle comes off the bottle body. Therefore, in the present invention, a reinforcing structure is provided to necessary portions not to deform the joining portion of the handle to the bottle body and further a coming off-preventing mechanism is provided so that the handle does not comes off the bottle. The coming off-preventing mechanism is accomplished by a supporting projection and/or a supplementary engaging protruding portion and a supplementary engaging recess portion. To ensure the coming off-preventing mechanism, the bottle body is formed by biaxial oriented blow molding with assembly beams of the handle as an insert.

23 Claims, 32 Drawing Sheets

SYNTHETIC RESIN BOTTLE WITH HANDLE AND ITS PRODUCTION METHOD

TECHNICAL FIELD

The present invention relates to a synthetic resin bottle with a handle comprising a handle and a bottle body which are separately molded and securely joined together, wherein the bottle body is formed by biaxial oriented blow molding, and its production method.

BACKGROUND ART

Japanese Published Unexamined Utility Model Laid Open No. 1988 (S63)-147429 disclosed a typical large-sized synthetic resin bottle with a handle in which a handle and a bottle body are separately molded and joined together.

The conventional bottle comprises as follows. The bottle body is formed by biaxial oriented blow molding. During the blow molding, a recessed portion is vertically formed in an arc-like configuration at a rear portion of the bottle body, an engaging convexity extending in a vertical direction is formed in an arc-like configuration at the center of the recessed portion, grooves of which both ends are closed are vertically formed in an arc like configuration on the both side surfaces of the engaging convexity.

The handle comprises a pair of front frames formed in an arc-like configuration and a grip portion connecting the upper ends and the lower ends of the front frames and is formed by injection molding. During the injection molding, engaging projections are formed at the both sides of the front frames.

By strongly pushing the handle from the rear side to the recessed portion of the bottle body, the engaging projections of the handle are constrained to pass over engaging portions disposed on the tip of the engaging convexity so that the handle is joined to the bottle body not to be detachable.

The conventional technique as mentioned above has problems as follows.

Since the joint of the handle to the bottle body requires strong putting force, an equipment used for joining the handle to the bottle body is required, thereby increasing the production cost.

The thickness of the bottle body is thin because the bottle body is formed by biaxial oriented blow molding. Therefore, when the strong putting force is applied to the body to join the handle thereto, there is a possibility of irregular deformation such as buckling deformation of the bottle body by this force, thereby sometime producing a rejected article when joining the handle.

Since the thickness of the bottle body is thin because the bottle body is formed by biaxial oriented blow molding, it is easy to produce an elastic deflection by the load on the portion engaged with the handle. The joining force between the bottle body and a handle becomes weak due to the elastic deflection so that there is a possibility that the handle comes off the bottle body.

The joint of the handle to the bottle body is maintained only by the engagement of the engaging projections to the grooves, which is provided by that the engaging projections are constrained to pass over the engaging portions, so that it is easy to produce looseness on the joint between the bottle body and the handle. This causes the unstable handling of the bottle on grasp of the handle.

The bottle body and the handle are separately molded and the bottle body is formed by biaxial oriented blow molding while the handle is formed by injection molding, thereby dimensional accuracies between the bottle body and the handle are quite different from each other. Therefore, it is easy to produce looseness on the joint between the bottle body and the handle.

It is impossible to form the engaging portion of the bottle body sharp because of the biaxial oriented blow molding so that it is difficult to provide a strong and stable joint of the handle to the bottle body.

Because the recessed portion of the bottle body for joining the handle has a structure curved inwardly, the recessed portion is less durable against the loading applied to the bottle body during using than the other portion of the bottle body.

In particular, in state of heat filling of the content, the bottle body is slightly softened by the heat of the content so that the durability against the loading is relatively greatly weakened. Thereby, it is possibility of partial buckling at the recessed portion by the loading during using.

When the bottle body is used by gripping the handle in a state of filling the content in the bottle body, it is possibility of sinking deformation of the lower end portion of the recessed portion of the bottle body by that the lower end portion is applied with the load. It is impossible to repair the sinking deformation which is permanent, thereby turning to the poor-looking and deteriorating the value as goods.

For solving the problem of sinking deformation of the lower end portion of the recessed portion, there is a method for increasing the thickness of the bottle body. However, in this case, the synthetic resin material for forming the bottle body is increased so that the production cost becomes higher.

It should be noted that a synthetic resin bottle with a handle which has been devised by this applicant is disclosed in Japanese Utility Model Application No. 1992 (H4)-71484.

It is an object of the present invention to prevent the deformation of the engaging portion of the bottle body where is engaged with the handle, thereby providing the strong and stable joint between the bottle body and the handle.

It is an object of the present invention to prevent the joint at the bottle side where is engaged with the handle from producing the deflection while the bottle is loaded, thereby providing the strong and stable joint between the bottle body and the handle.

It is an object of the present invention to increase the strength at the recessed portion of the bottle body by joining the handle to the bottle body.

It is an object of the present invention to simplify the production steps of the synthetic resin bottle with a handle.

DISCLOSURE OF INVENTION

1. A synthetic resin bottle with a handle according to the present invention is accomplished by comprising a bottle body as described below and a handle joined to the bottle body.

That is, the handle comprises a pair of assembly beams arranged to oppose each other, a handle plate being integrally disposed between both end portions of the assembly beams, and engaging pieces being convexly formed on the inner surfaces of the both assembly beams.

While, the bottle body formed by biaxial oriented blow molding with the assembly beams of the handle as an insert and having a body portion of which inside is hollow for accommodating the content. A recessed portion is concavely formed at a rear portion of the body portion, a vertical protruding portion to be inserted between the both assembly beams of the handle as well as supporting protuberances contacting and stopping the outer surfaces of the assembly beams are formed on the bottom surface of the recessed portion. Bulge pieces protruding outwardly and extending vertically are formed on both side surfaces of the vertical protruding portion, and engaging grooves into which the engaging pieces of the handle are engaged are each formed between the bulge portions and the bottom surface of the recessed portion.

The upper ends of the engaging grooves of the bottle body may be stopping ends, and the upper ends of the engaging pieces of the handle are stopped by the stopping ends.

It is preferably that the vertical protruding portion has a plurality of reinforcing ribs laterally extending and disposed on the top wall of the vertical protruding portion, because the strength of the vertical protruding portion is increased.

It is preferably that a bridge is disposed between the both assembly beams of the handle, because the efficiency of preventing widening of the interval between the assembly beams can be increased so that the handle becomes difficult to come off the bottle body.

2. A synthetic resin bottle with a handle according to the present invention is also accomplished by comprising a bottle body as described below and a handle joined to the bottle body.

That is, the handle comprises a pair of assembly beams arranged to oppose each other, a handle plate being integrally disposed between both end portions of the assembly beams, engaging pieces being convexly formed on the inner surfaces of the both assembly beams, and a supplementary engaging protruding portion being convexly disposed to the both assembly beams.

While, the bottle body formed by biaxial oriented blow molding with the assembly beams of the handle as an insert and having a body portion of which inside is hollow for accommodating the content. A recessed portion is concavely formed at a rear portion of the body portion, a recessed portion being concavely formed at a rear portion of the body portion, a vertical protruding portion to be inserted between the both assembly beams of the handle as well as a supplementary engaging recess portion into which the supplementary engaging protruding portion is engaged are formed on the bottom surface of the recessed portion. Bulge pieces protruding outwardly and extending vertically being formed on both side surfaces of the vertical protruding portion, and engaging grooves into which the engaging pieces of the handle are engaged are each formed between the bulge portions and the bottom surface of the recessed portion.

It is preferable that the vertical protruding portion has a plurality of reinforcing ribs laterally extending and disposed on the top walls of the vertical protruding portion, because the strength of the vertical protruding portion is increased.

The depth of the reinforcing ribs is preferably set to 5 or more times of stretch ratio of thickness of the vertical protruding portion.

It is preferable that supporting protuberances contacting and stopping the outer surfaces of the assembly beams are formed on the bottom surface of the recessed portion of the bottle body, because the efficiency of preventing widening of the interval between the assembly beams can be increased so that the handle becomes more difficult to coming off the bottle body.

In this case, it is preferable that irregularities laterally extending are formed on the supporting protuberances so as to increasing the strength of the supporting protuberances.

It is preferable that the handle has a symmetrical structure vertically and laterally from the manufacturing point of view.

It is preferable that the tip surfaces of the assembly beams each comprise linear flat surface so that the handle can be more stably combined to the bottle body.

It is preferable that constricted portions are formed on a portion, adjacent the supplementary engaging protruding portion, in the engaging pieces of the handle from a formability point of view.

The supplementary engaging protruding portion of the handle may comprise projecting pieces each projecting from the tip surfaces of the assembly beams, and the supplementary engaging recess portion of the bottle body may comprises engaging recesses each having a bottom and disposed on the bottom surface of the recessed portion.

In this case, concave portions are preferably formed on the tip surfaces of the projecting pieces at substantially center thereof from a formability point of view.

The supplementary engaging protruding portion of the handle may comprise projecting pieces projecting from the tip surfaces of the assembly beams, the tip ends of the projecting pieces being formed to be expanded portions, and the supplementary engaging recess portion of the bottle body comprising engaging recesses each having a bottom and disposed on the bottom surface of the recessed portion.

In addition, the supplementary engaging protruding portion of the handle may comprise expanded portions formed at the tips of the projecting pieces as the supplementary engaging protruding portion, while the supplementary engaging recess portion of the bottle body may have constricted portions for constricting the opening edge portions of the engaging recesses.

Further, engaging grooves may formed between the expanded portions and the projecting pieces.

Furthermore, notches widening the width of the engaging grooves may formed to a portion, opposing the projecting pieces, in the expanded portions.

The supplementary engaging protruding portion of the handle may comprise projecting pieces projecting from the tip surfaces of the assembly beams and engaging pins projecting from the engaging pieces in the direction opposite to the projecting direction of the projecting pieces, while the supplementary engaging recess portion of the bottle body may comprise engaging recesses each having a bottom and disposed on the bottom surface of the recessed portion and engaging concave portions disposed on the vertical protruding portion.

3. A synthetic resin bottle with a handle according to the present invention is also accomplished by comprising a bottle body as described below and a handle joined to the bottle body.

That is, the handle comprises a pair of assembly beams arranged to oppose each other, a handle plate being integrally disposed between both end portions of the assembly beams, and engaging pieces being convexly formed on the inner surfaces of the both assembly beams.

While the bottle body having a body portion of which inside is hollow for accommodating the content. A recessed portion is concavely formed at a rear portion of the body portion, a vertical protruding portion to be inserted between the both assembly beams of the handle is formed on the bottom surface of the recessed portion. Bulge pieces protruding outwardly and extending vertically are formed on both side surfaces of the vertical protruding portion, and engaging grooves into which the engaging pieces of the handle are engaged being are formed between the bulge portions and the bottom surface of the recessed portion. A protuberance formed in a curved shape being formed on a connecting portion between the recessed portion and the body portion which is the lower edge of the recessed portion, and a vertical groove concavely disposed on the protuberance.

In this case, the bottle body is formed by biaxial oriented blow molding with the assembly beams of said handle as an insert.

4. A synthetic resin bottle with a handle according to the present invention is also accomplished by comprising a bottle body as described below and a handle joined to the bottle body.

That is, the handle comprises a pair of assembly beams arranged to oppose each other, a handle plate being integrally disposed between both end portions of the assembly beams, engaging pieces being convexly formed on the inner surfaces of the both assembly beams, and a recessed portion for receiving user's finger being formed on an upper outer surface of the handle plate.

While the bottle body having a body portion of which inside is hollow for accommodating the content. A recessed portion is concavely formed at a rear portion of the body portion, a vertical protruding portion to be inserted between the both assembly beams of the handle is formed on the bottom surface of the recessed portion. Bulge pieces protruding outwardly and extending vertically are formed on both side surfaces of the vertical protruding portion, and engaging grooves into which the engaging pieces of the handle are engaged being are formed between the bulge portions and the bottom surface of the recessed portion.

5. A production method of a synthetic resin bottle with a handle is accomplished in a following manner.

A handle is previously formed by suitable means such as injection molding. The handle comprises a pair of assembly beams arranged to oppose each other, a handle plate being integrally disposed between both end portions of the assembly beams, and engaging pieces being convexly formed on the inner surfaces of the both assembly beams.

After setting the assembly beams including the engaging pieces of the handle as an insert to a mold for blow molding a bottle body, the bottle body is molded with the mold by biaxial oriented blow molding from a preform. By this blow molding, a vertical protruding portion to be inserted between the both assembly beams of the handle, bulge pieces protruding outwardly and extending vertically from both side surfaces of the vertical protruding portion, and engaging grooves into which the engaging pieces of the handle are engaged are formed in the bottle body.

As a result of this, the handle can be combined to the bottle body at the same time as the molding of the bottle body.

In this production method, the opening angle between the both engaging pieces of the handle when its center is an oriented central axis of the preform which is a material of the bottle body is preferably set to an angle of substantially 90°.

BEST MODE FOR CARRYING OUT THE INVENTION

[First Embodiment]

Figure 1:
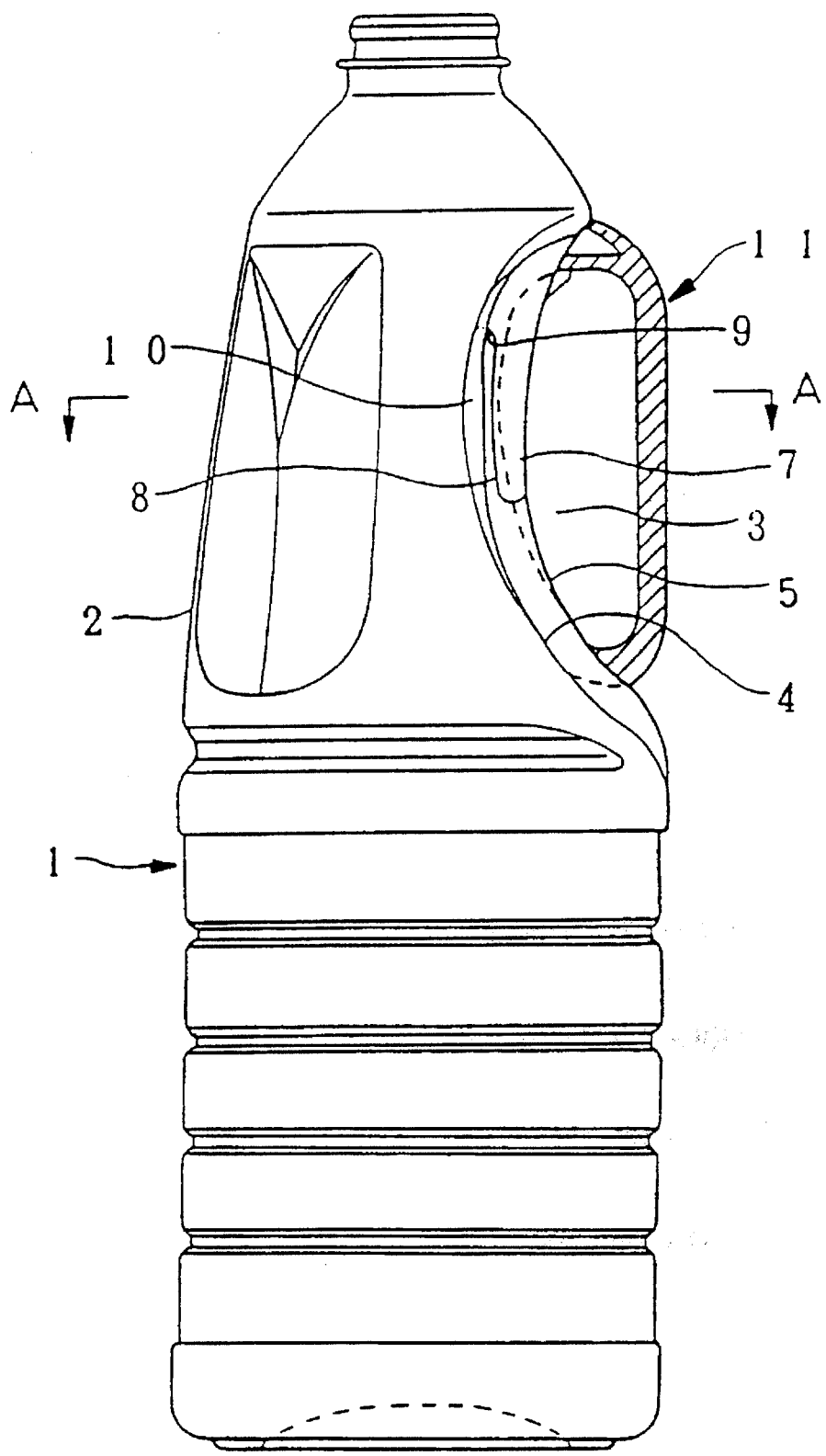
FIG. 1 is a view showing a first embodiment of the present invention, which is a side view of a bottle having a handle of which a part is shown in section.
Figure 2:
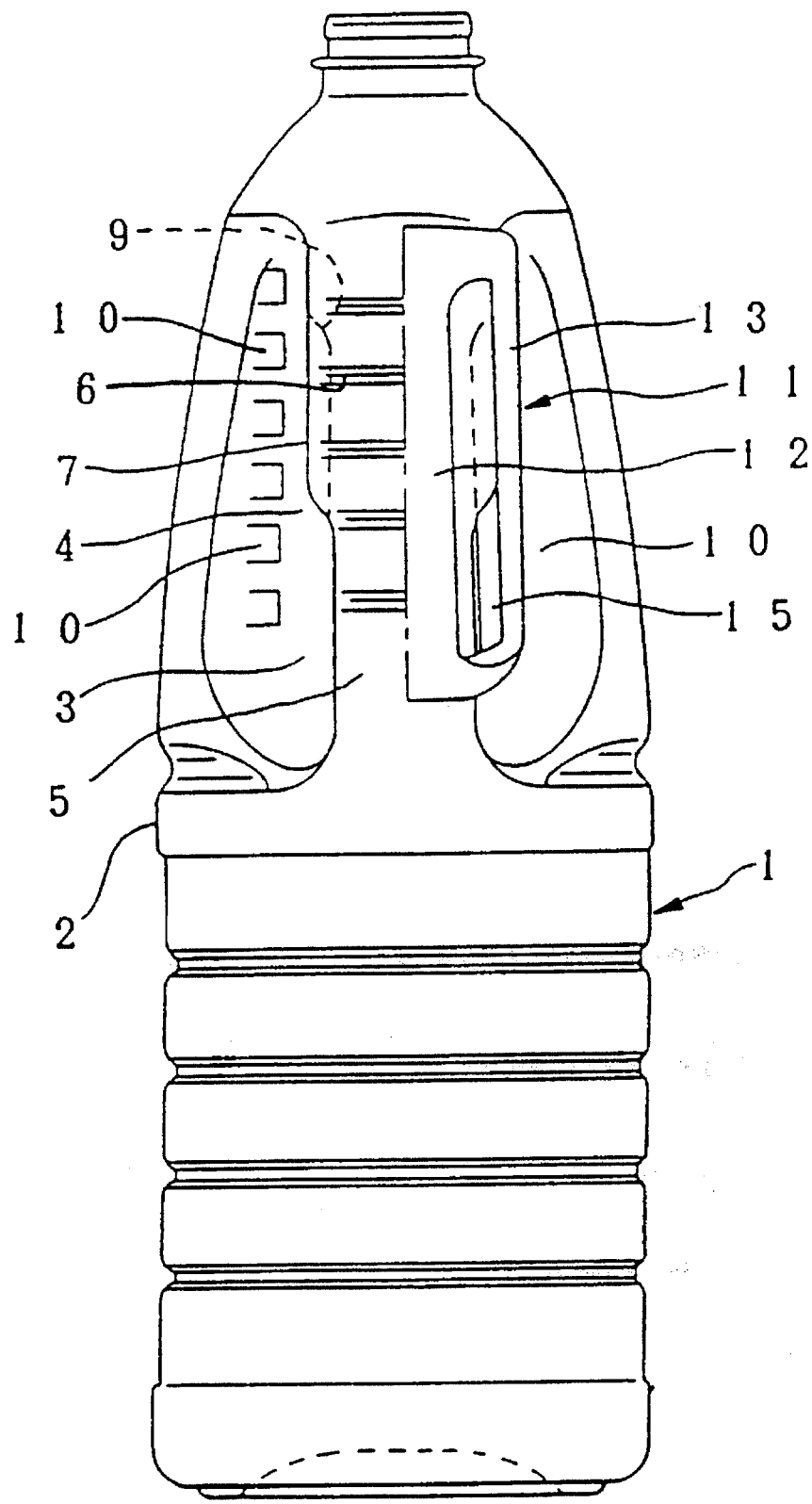
FIG. 2 is a view showing the first embodiment of the present invention, which is a rear view of the bottle with the handle shown by deleting the left half of the handle.

Hereinafter, a first embodiment of the present invention will be described with reference to FIGS. 1–6.

A bottle comprises a bottle body 1 and a handle 11 joined to the bottle body 1.

The bottle body 1 is made of synthetic resin and is formed by biaxial oriented blow molding. The capacity of the bottle body 1 is approximately 2.5–4.0 liters.

The bottle body 1 is provided with a body portion 2, a recessed portion 3 curved along the vertical direction and sunk at the rear portion of the upper half of the body portion 2, and a vertical protruding portion 5, which is convexly formed and has a relatively large width and a substantially constant height, disposed on a recessed bottom surface 4 of the recessed portion 3 at the center thereof. The vertical protruding portion 5 is convexly disposed to be a bulge extending along the whole range of the recessed portion 3 in the vertical direction.

A plurality of reinforcing ribs 6 laterally extending are disposed at intervals in the vertical direction on a top wall of the vertical protruding portion 5 along the width thereof. The reinforcing ribs 6 reinforce the vertical protruding portion 5 to prevent the vertical protruding portion 5 from deforming in a direction reducing its width, thereby preventing the joint between the bottle body and the handle 11 from weakening.

Bulge pieces 7 are vertically convexly disposed on the both sides of the approximate upper half of the vertical protruding portion 5 at the end sides thereof. An engaging groove 8 of which an upper end is a stopping end 9 is provided between each of the bulge pieces 7 and the recessed bottom surface 4 of the recessed portion 3. Supporting protuberances 10 are convexly disposed at the side of the vertical protruding portion 5 on the recessed bottom surface 4. When the handle 11 is joined to the bottle body 1, the supporting protuberances 10 are in contact with the outer surface of both assembly beams 13 of the handle 11.

The supporting protuberances 10 each have a structure for contacting the outer surface of the assembly beams 13 of the handle 11 joined to the bottle body 1. The structure of the supporting protuberances 10 may, simply, be a bulge convexly disposed continuously as shown in the right halves of the FIG. 1 and FIG. 2 or may be a plurality of projections vertically disposed at intervals as shown in the left half of FIG. 2.

The supporting protuberances 10 are in contact with the outer surface of the both assembly beams 13 of the handle 11 to prevent the assembly beams 13 from deforming (this deformation weakens the joining force of the handle 11 to the bottle body) in the direction widening the interval therebetween.

In the first embodiment, the joining portion at the bottle body 1 side comprises the engaging grooves 8 including the bulge pieces 7 and the supporting protuberances 10.

Figure 4:
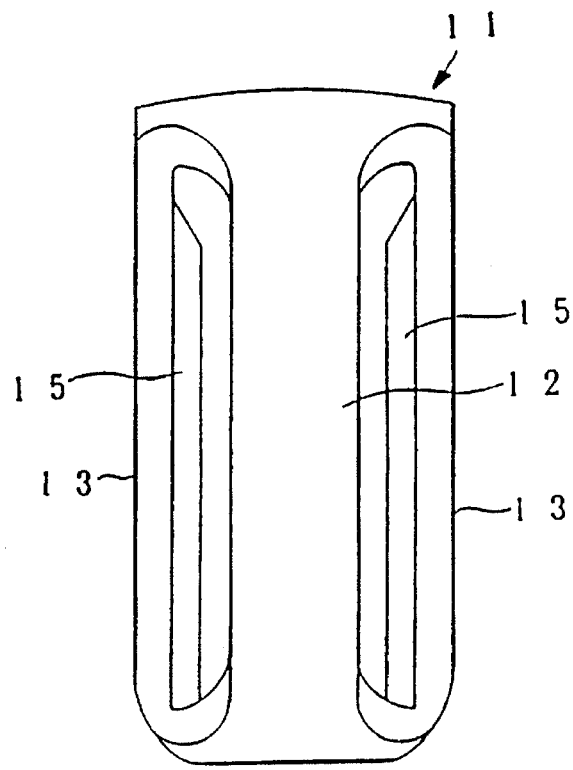
FIG. 4 is a rear view of the handle according to the first embodiment.
Figure 5:
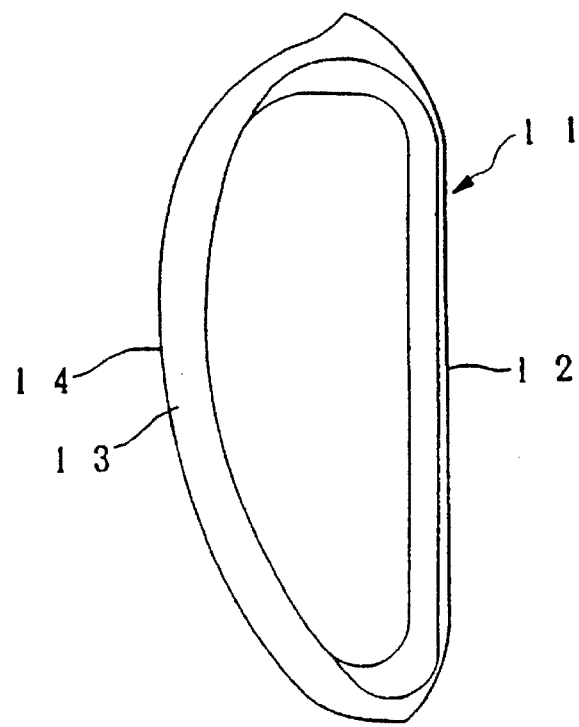
FIG. 5 is a side view of the handle according to the first embodiment.
Figure 6:
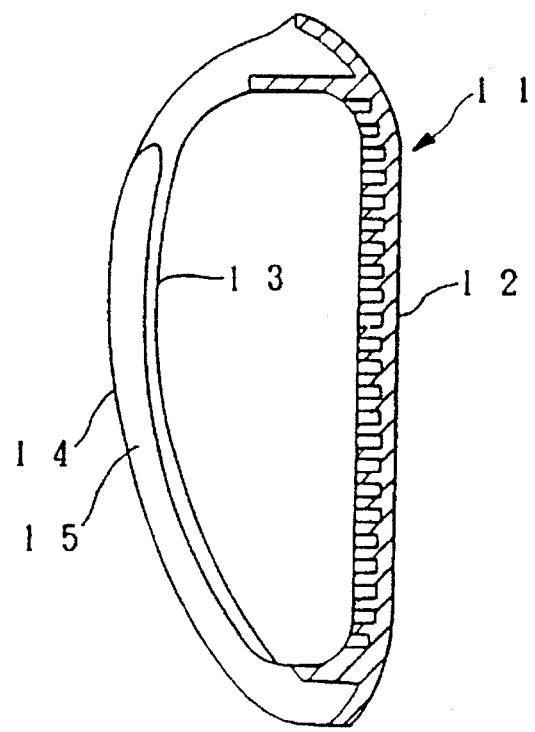
FIG. 6 is a longitudinal sectional view of the handle according to the first embodiment.
Figure 7:
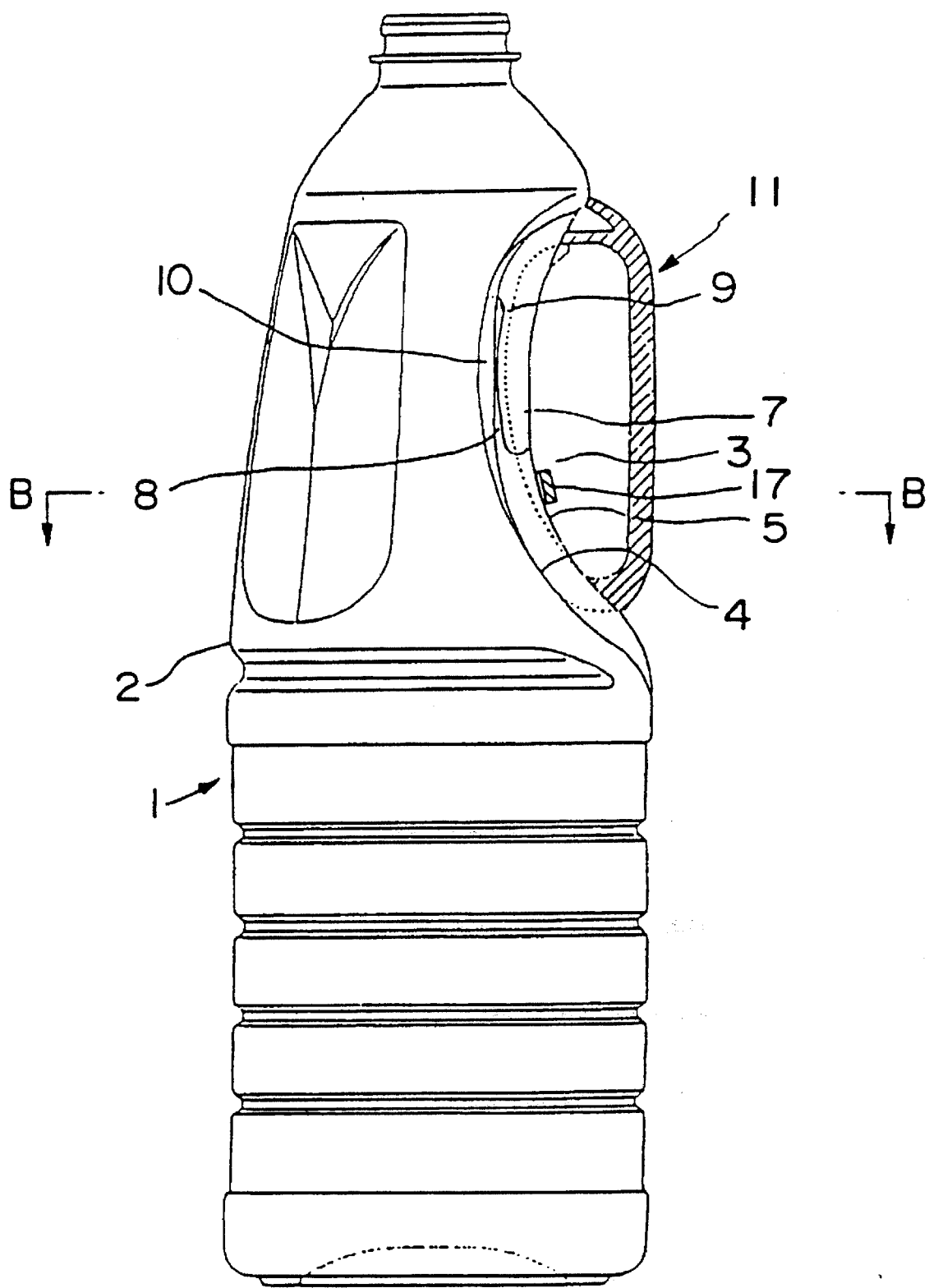
FIG. 7 is a view showing a second embodiment of the present invention, which is a side view of a bottle having a handle and a bridge of which parts are shown in section.
Figure 8:
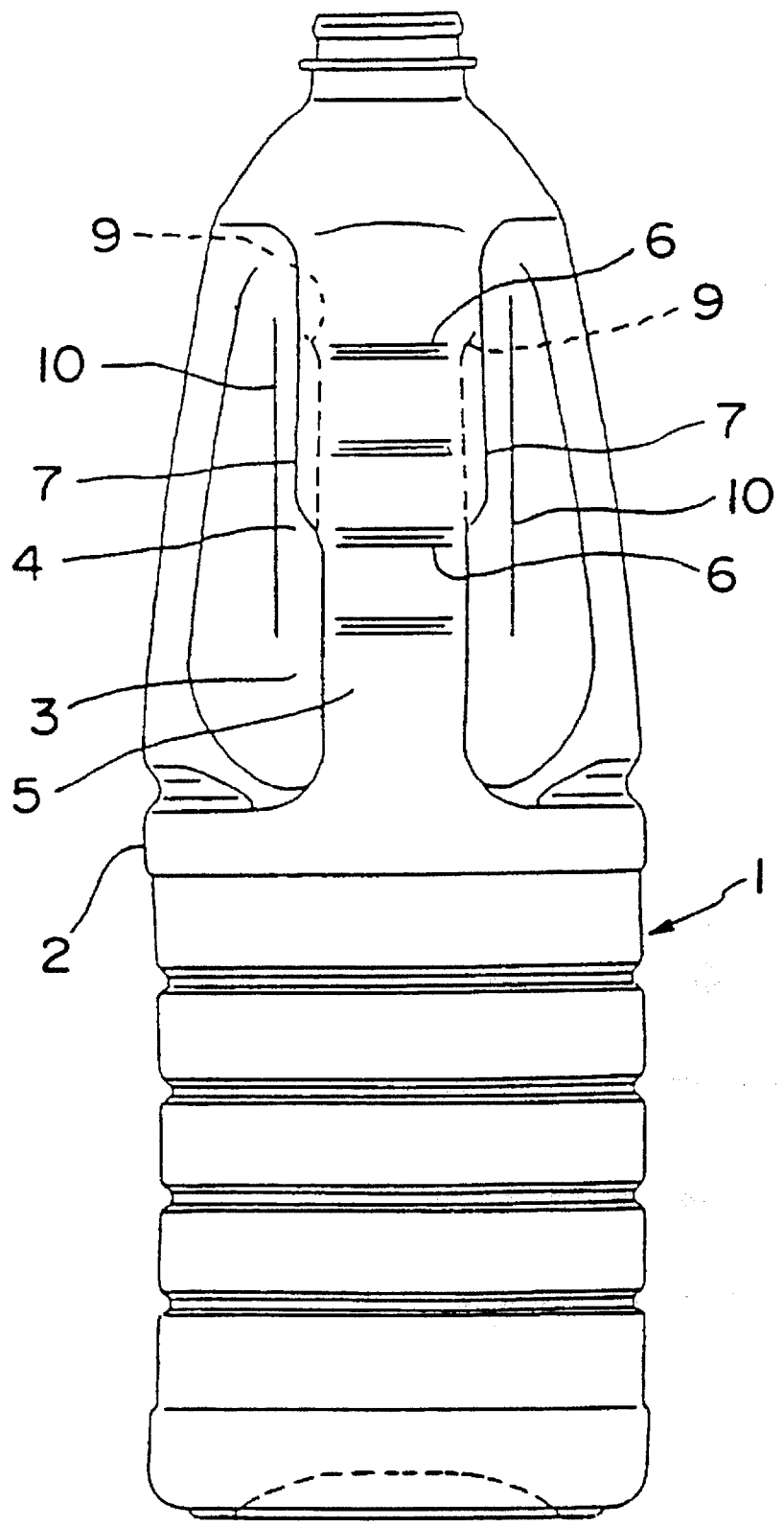
FIG. 8 is a rear view of a bottle body according to the second embodiment.
Figure 9:
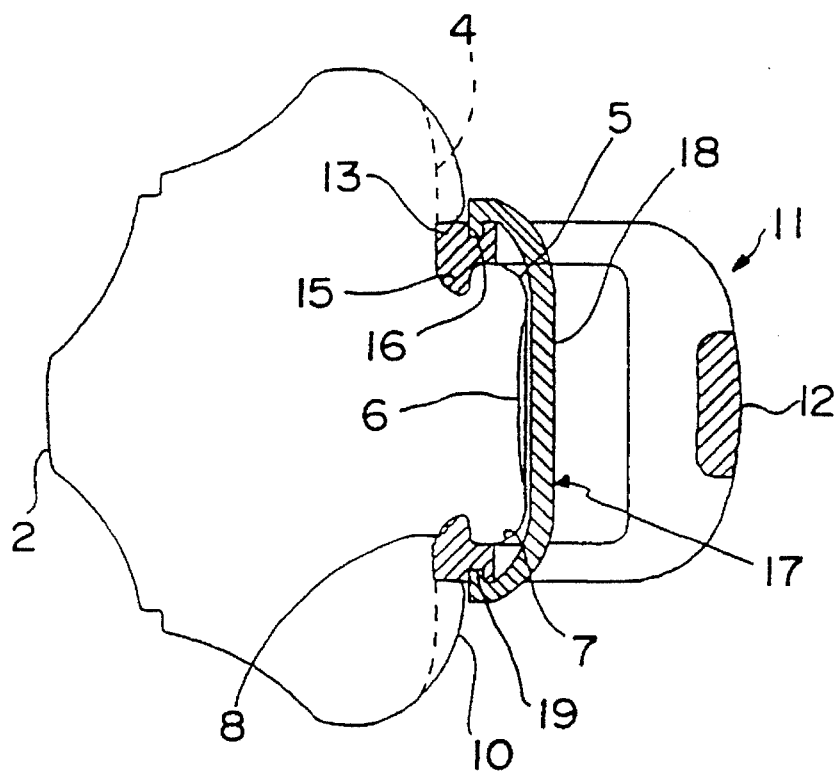
FIG. 9 an enlarged cross sectional view of the bottle taken along the line B—B of FIG. 7.
Figure 10:
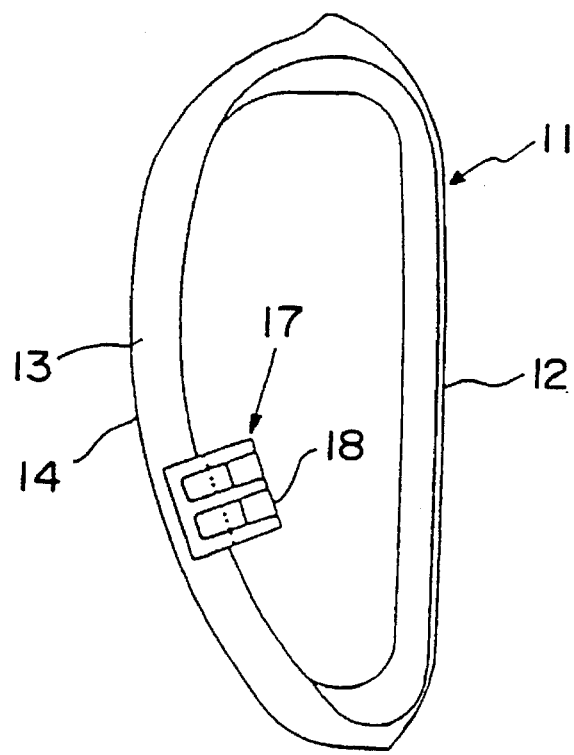
FIG. 10 is a side view showing a state in which the handle and the bridge are combined according to the second embodiment.
Figure 11:
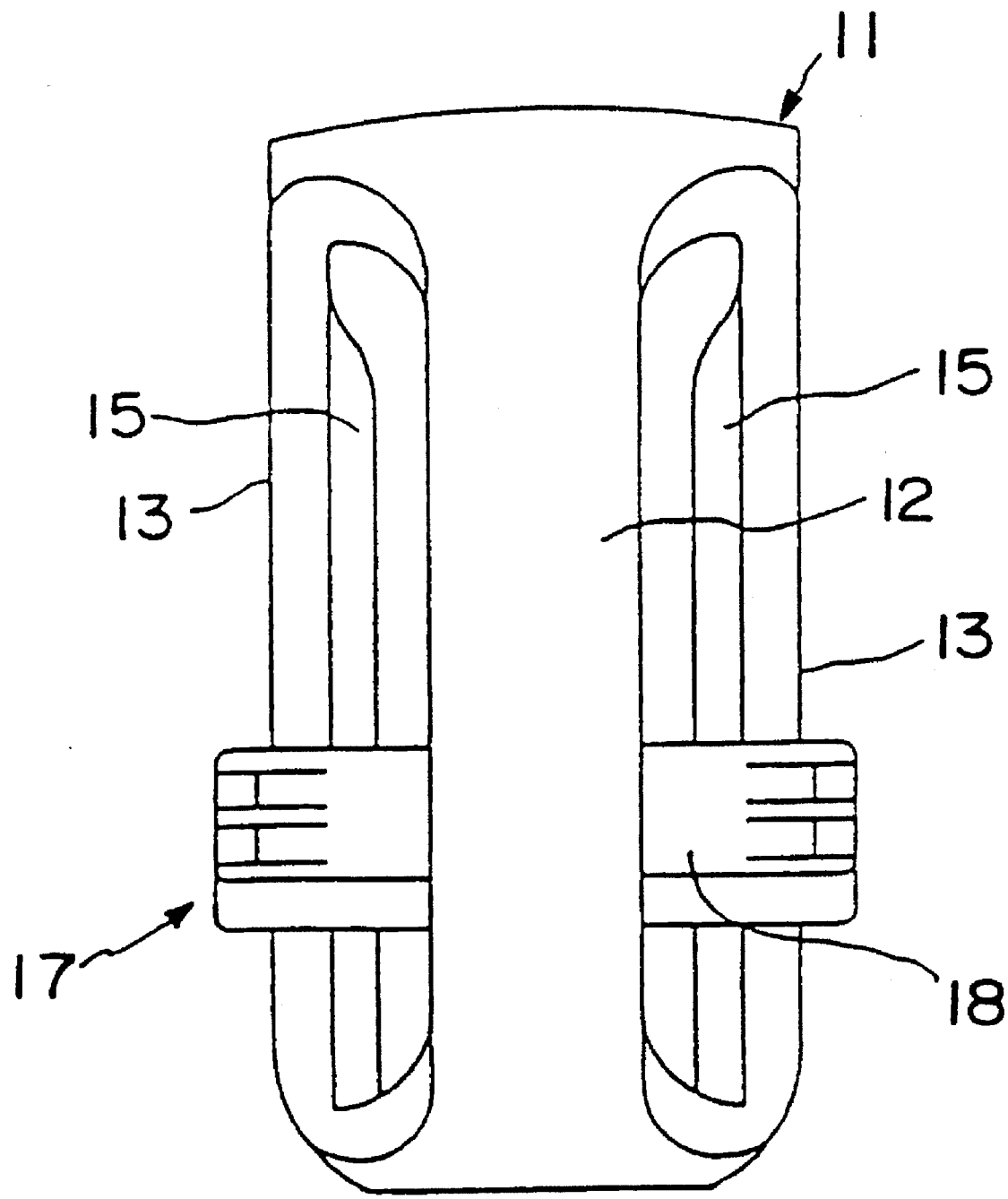
FIG. 11 is a side view showing a state in which the handle and the bridge are combined according to the second embodiment.
Figure 12:
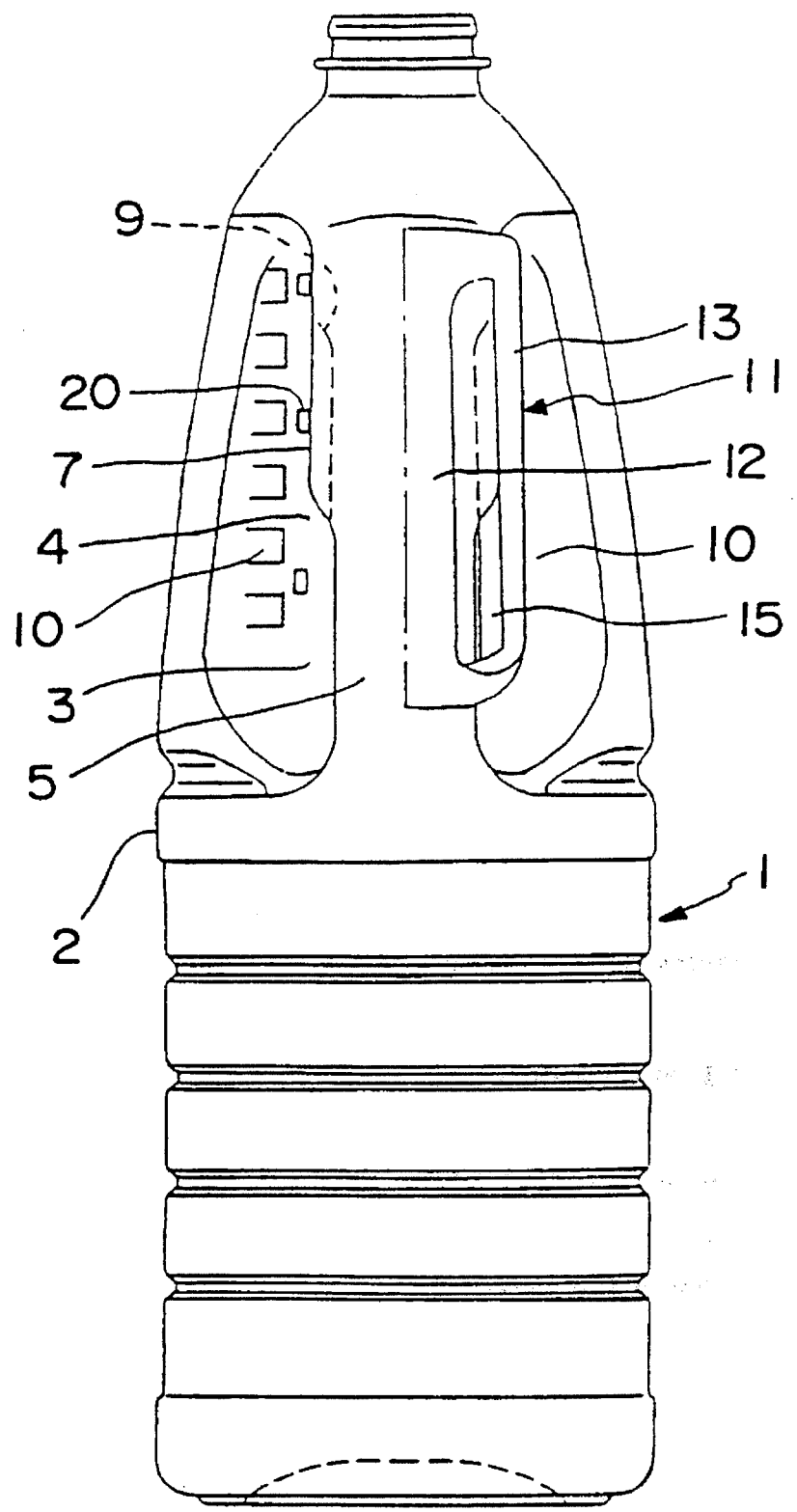
FIG. 12 is a view showing a third embodiment of the present invention, which is a rear view of a bottle with a handle shown by deleting the left half of the handle.

The handle 11 is formed by injection molding and made of relatively hard synthetic resin. As shown in FIG. 4–FIG. 6, the handle 11 comprises a pair of assembly beams 13 disposed parallel each other, which are curved substantially in the same way as the recessed bottom surface 4 along the recessed bottom surface 4, and a handle plate 12 formed in a flat sheet-like configuration, which is integrally formed with the upper ends and the lower ends of the assembly beams 13 therebetween. The handle plate 12 is provided with a plurality of concave portions for lightning.

Each of the assembly beams 13 is provided with an engaging piece 15 projecting inwardly and extending from the lower end to near the upper end, which is disposed at the tip of a side surface facing to one of the other assembly beam 13. The tip surfaces of the engaging pieces 15 are substantially formed to be a plane with the tip surfaces 14 of the assembly beams 13, respectively. The tip surfaces 14 each are formed with the same curved surface as the recessed bottom surface 4. The rear surfaces of the engaging pieces 15 each are a flat surface perpendicular to a parting line of the bottle body 12 for the biaxial oriented blow molding.

Thereby, the engaging pieces 15 are allowed to smoothly sliding into the rear side portions of the bottle body 1 which are molded with the bulge pieces 7 and it becomes difficult to produce force applying outwardly such as weakening the engagements between the engaging pieces 15 and the bulge pieces 7.

The joint between the bottle body 1 and the handle 11 is accomplished by the engagements between the engaging pieces 15 and the bulge pieces 7. Each upper end of the engaging pieces 15 of the handle 11 is in contact with the stopping end 9 of the engaging groove 8 of the bottle body 1. This securely prevents the handle 11 from slipping upwardly and coming off the bottle body 1.

In the first embodiment, the joining portion at the handle side comprises the assembly beams 13 and the engaging pieces 15.

Figure 3:
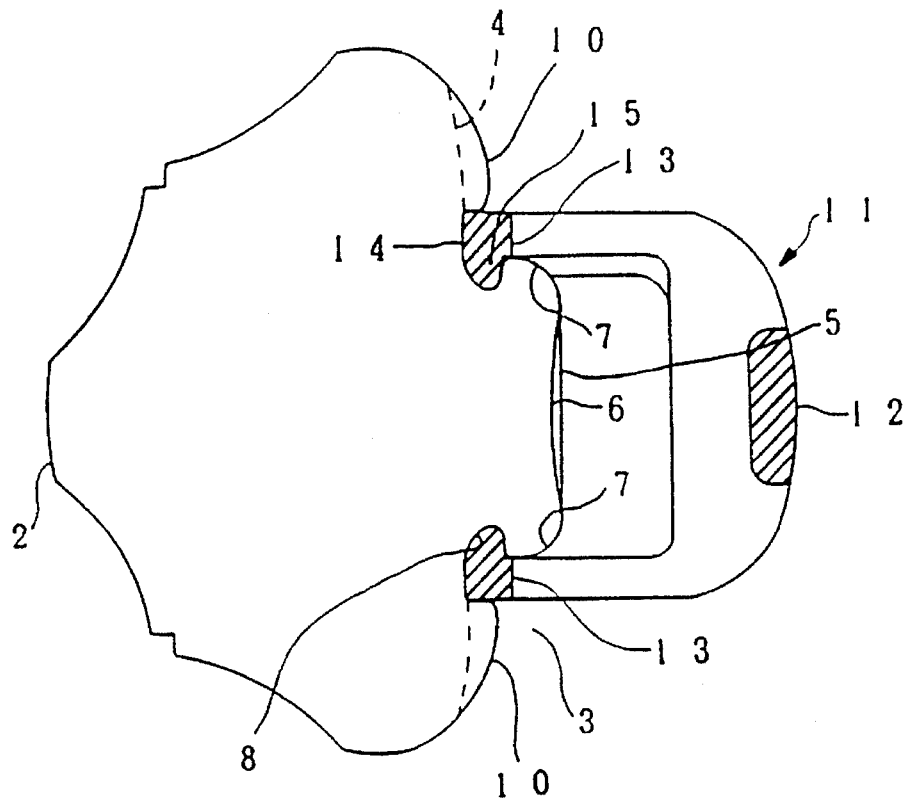
FIG. 3 an enlarged cross sectional view of the bottle taken along the line A—A of FIG. 1.

The joint of the handle 11 to the bottle body 1 is accomplished by forming the bottle body 1 by biaxial oriented blow molding with the joining portion of the handle 11 as an insert. By forming the bottle body 1 by biaxial oriented blow molding with the joining portion of the handle 11 as the insert, the joining portion of the bottle body 1 is molded in a configuration wrapping the joining portion of the handle 11 and can engage with the joining portion of the handle 11 with substantially no space and with a large engaging force therebetween, as shown in FIG. 3.

As the bottle body 1 is formed by biaxial oriented blow molding with the joining portion of the handle 11 as the insert, the joint of the handle 1 to the bottle body 1 can be accomplished at the same time as the biaxial oriented blow molding of the bottle body 1 so that an operational step for joining the handle becomes unnecessary, thereby simplifying the production steps of the bottle with a handle.

As mentioned above, as the bottle body 1 is formed by biaxial oriented blow molding with the joining portion of the handle 11 as the insert, the supporting protuberances 10 are formed with the outer surface of the assembly beams 13 of the handle 11 as a part of a surface of the mold so that the supporting protuberances 10 can be mold regardless of release from the blow mold. Therefore, it is possible to design the projecting height of the supporting protuberances 10 higher (for example 3.5 mm), thereby securely and strongly preventing the assembly beams 13 of the handle 11 from widening the interval therebetween.

The supporting protuberances 10, vertical protruding portion 5, and the reinforcing ribs 6 provides the strong and stable joint of the handle 11 to the bottle body 1 and allows the handling of the bottle with the handle 11 gripped to be secure and convenient.

As mentioned above, when the bottle body 1 is formed by biaxial oriented blow molding with the joining portion of the handle 11 as the insert, there is no possibility of irregular deformation such as permanent deformation (e.g. buckling deformation) of the joining portion of the bottle body 1. Therefore, the handle 11 can be joined to the bottle body 1 securely and preferably.

The biaxial oriented blow molding with the joining portion of the handle 11 as the insert to forming the bottle body 1 can be accomplished by providing little modification to an existing blow molding machine for molding bottle bodies, thereby cutting down the remarkable cost increase for performing the improved production method.

Since the joint between the bottle body 1 and the handle 11 can be strong, it is unnecessary to apply a strong capability for self-retaining its configuration to the handle 11 as a single unit formed by injection molding, thereby allowing the thickness of the handle 11 to be formed relatively thin. As a result of this, the amount of synthetic resin for forming the handle 11 can be reduced, thereby the production cost can also be reduced.

[Second Embodiment]

Hereinafter, a second embodiment of the present invention will be described with reference to FIGS. 7–11. Since the basic components of the second embodiment are same as that of the first embodiment, the description will be made as regard to the differences between the second embodiment and the first embodiment and omitted in part by using same reference numerals for designating the same parts as that of the first embodiment.

Between the both assembly beams 13 of the handle 11 of the second embodiment, a bridge 17 made of relatively hard synthetic resin and formed by injection molding is put over. The bridge 17 comprises a body plate 18 formed in an oblong flat sheet-like configuration of which both end portions are frontwardly curved equally and engaging convex portions 19 convexly disposed to face each other at the both sides of the body plate 18. The bridge 17 is fixed to the handle 11 by engaging the engaging convex portions 19 to engaging concave portion 16 recessed on the outer surfaces of the assembly beams 13 of the handle 11.

As the handle 11 is provided with the bridge 17 as mentioned above, the assembly beams 13 of the handle 11 can be more securely and strongly prevented from deforming to widen the interval therebetween. Thereby, the joint between the bottle body 1 and the handle 11 can be stronger.

Since the joint between the bridge and the handle should be accomplished in a deformed state of the bridge in an elastic direction shortening the interval between the assembly beams 13, the bridge is preferably combined to the handle before the joint of the handle to the bottle body, that is, before setting the joining portion of the handle to the blow mold as the insert.

[Third Embodiment]

A third embodiment of the present invention will be described with reference to FIGS. 12–15. Since the side view of the bottle body and the rear view of the handle are same as FIG. 1 and FIG. 4 of the first embodiment, these views are omitted.

Hereinafter, the description will be made as regard to the differences between the third embodiment and the first embodiment and omitted in part by using same reference numerals for designating the same parts as that of the first embodiment.

A plurality of engaging recesses 20 each having bottom are formed on the recessed bottom surface 4 at the side of the vertical protruding portion 5 in the bottle body 1 (6 engaging recesses in which each 3 engaging recesses are disposed each of the right and left sides in this embodiment). The engaging recesses 20 constitute a supplementary engaging recessed portion.

The supporting protuberances 10 contacting the outer surface of the assembly beams 13 are disposed on the recessed bottom surface 4 positioned at the outer portion of the engaging recesses 20.

In the third embodiment, the engaging grooves 8 including the bulge pieces 7, the engaging recesses 20, and the supporting protuberances 10 constitute the joining portion at the bottle body 1 side.

The handle plate 12 of the handle 11 is integrally disposed to the upper and lower ends of the assembly beams 13 through a connecting plate 21.

The tip surface 14 of the assembly beams 13 has the same curved configuration as that of the recessed bottom portion 4. Projecting pieces 22 engaging tightly to the engaging recesses 20 of the bottle body 1 are convexly disposed on the tip surface 14. The projecting pieces 22 constitute a supplementary engaging projection.

In the third embodiment, the tip surface 14, the engaging pieces 15, and assembly beams 13 having projecting pieces 22 constitute the joining portion at the handle 11 side.

Also in the third embodiment, the joint of the handle 11 to the bottle body 1 is accomplished by forming the bottle body 1 by biaxial oriented blow molding with the joining portion of the handle 11 as an insert.

Figure 13:
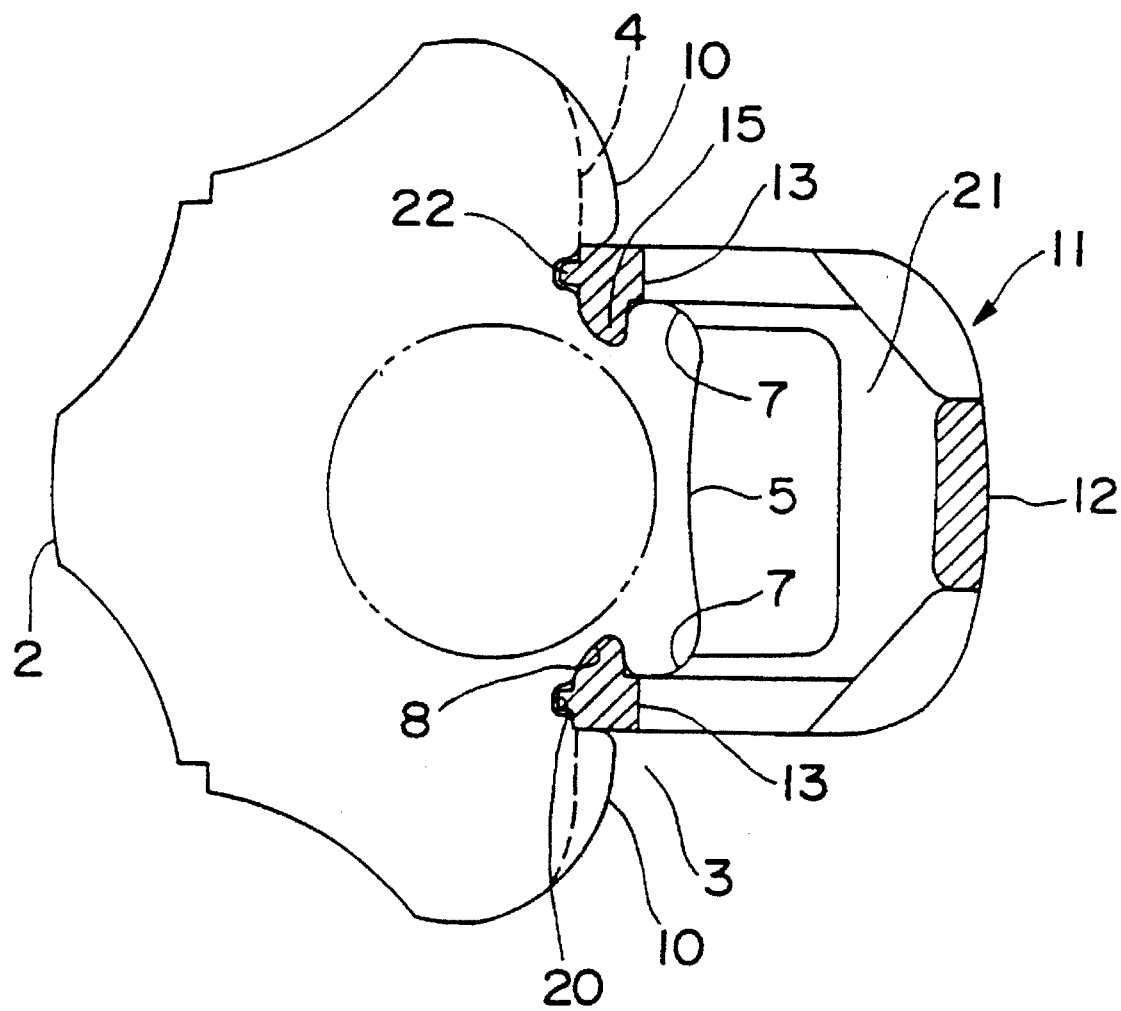
FIG. 13 is a view showing a third embodiment of the present invention, which is a cross sectional view corresponding to the view of FIG. 3.
Figure 14:
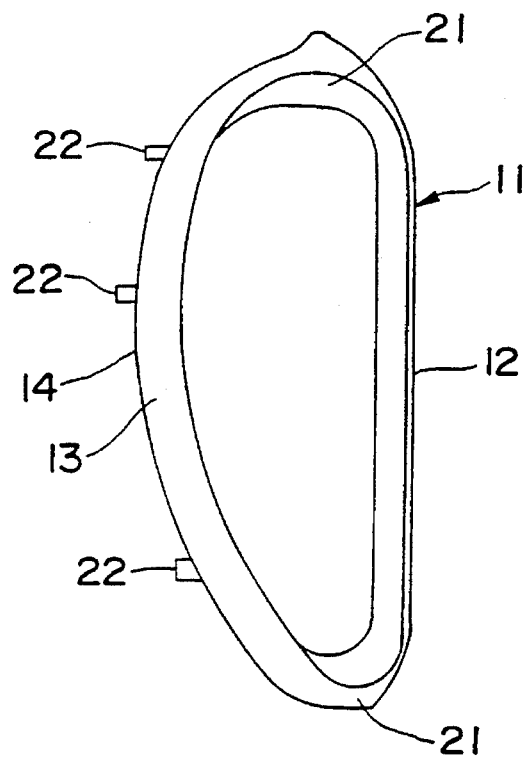
FIG. 14 is a side view of the handle according to the third embodiment.
Figure 15:
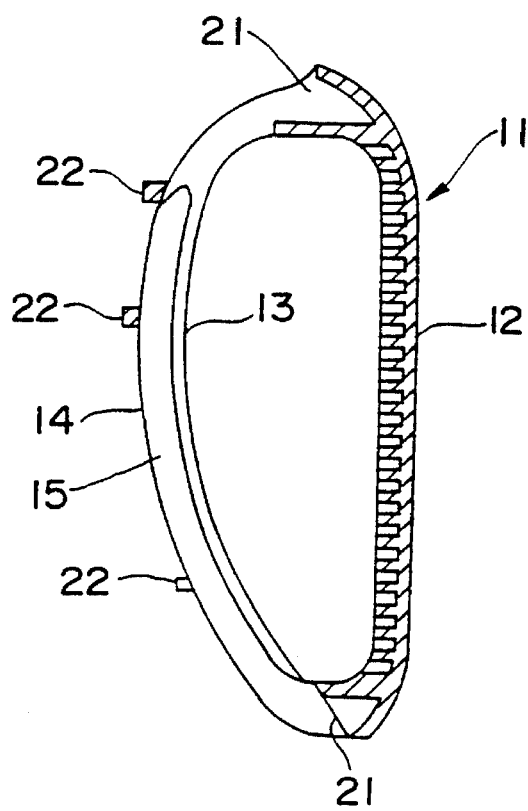
FIG. 15 is a longitudinal sectional view of the handle according to the third embodiment.
Figure 16:
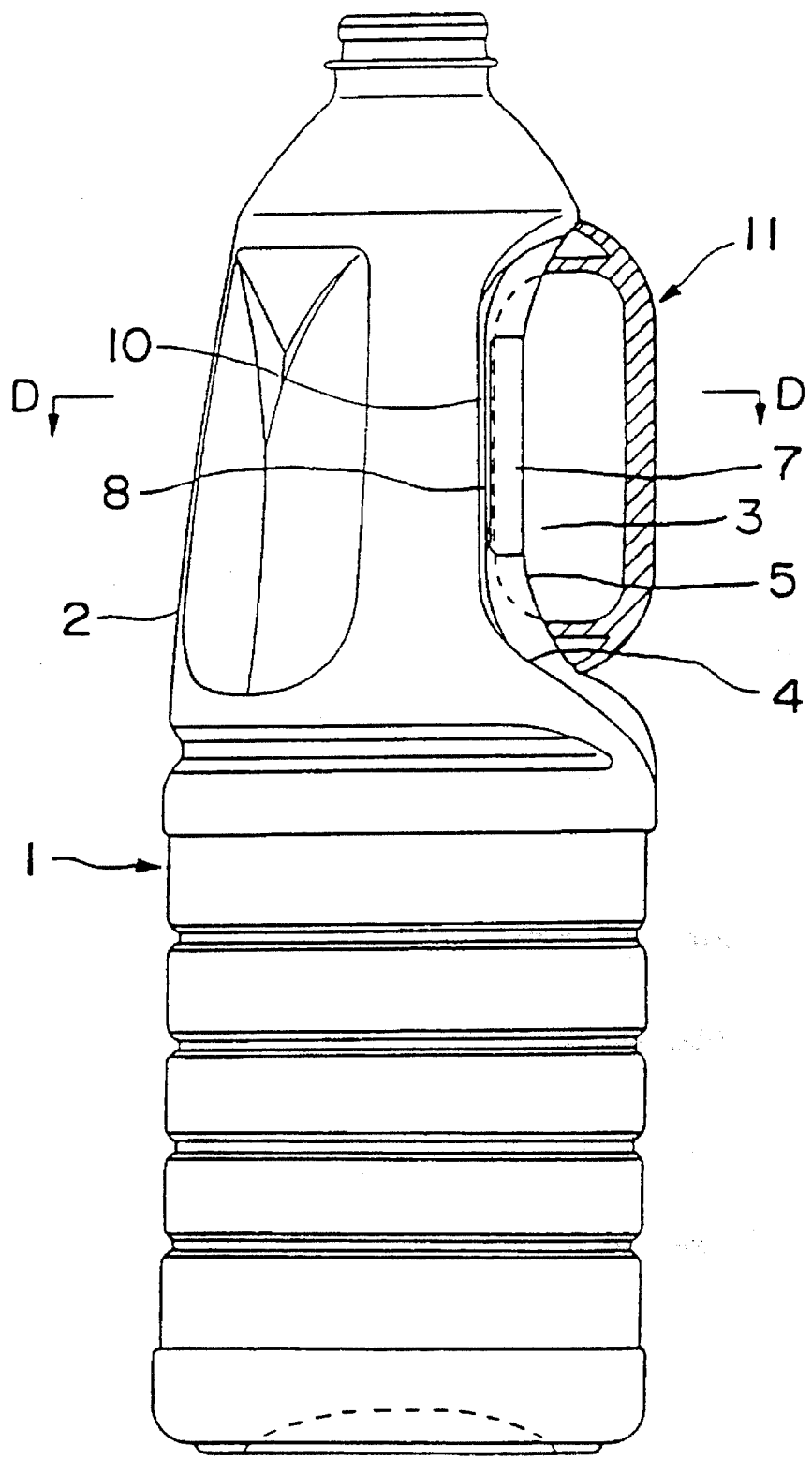
FIG. 16 is a view showing a fourth embodiment of the present invention, which is a side view of a bottle having a handle of which a part is shown in section.
Figure 17:
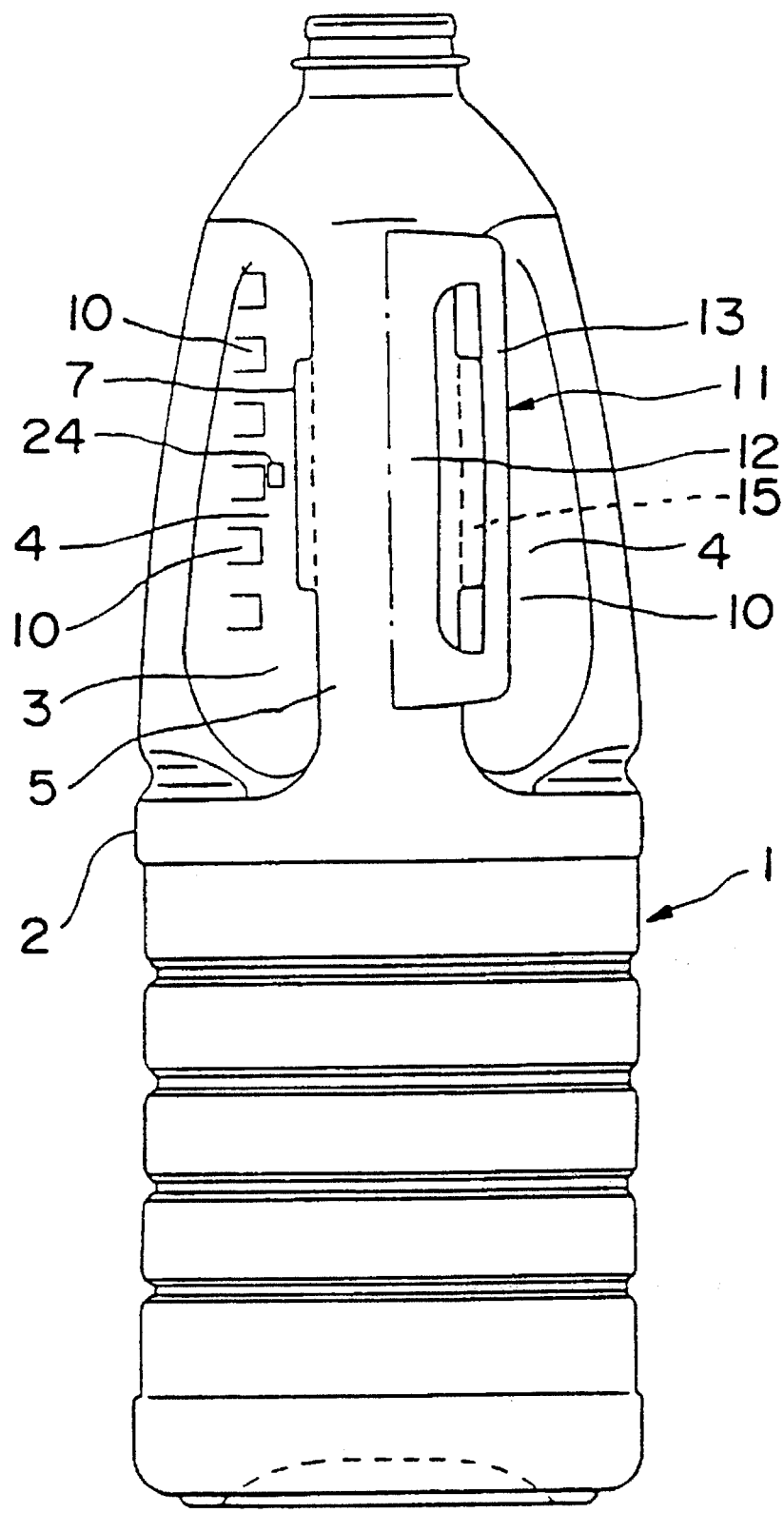
FIG. 17 is a view showing the fourth embodiment of the present invention, which is a rear view of the bottle with the handle shown by deleting the left half of the handle.

By forming the bottle body 1 by biaxial oriented blow molding with the joining portion of the handle 11 as the insert, the joining portion of the bottle body 1 is molded in a configuration wrapping the joining portion of the handle 11 and can engage with the joining portion of the handle 11 with substantially no space and with a large engaging force therebetween, as shown in FIG. 13.

By the engagement between the engaging recesses 20 of the bottle body 1 and the projecting pieces 22 of the handle, the engagement between the engaging grooves 8 and the engaging pieces 15 of the handle 11 can be stably maintained. Therefore, the joint of the handle 11 to the bottle body 1 becomes stable. As a result of this, the quite safe handling of the bottle with the handle 11 gripped can be accomplished.

The engagement between the engaging recesses 20 of the bottle body 1 and the projecting pieces 22 strongly and securely prevents the displacement by the deflection in the direction weakening the joining force between the joining portion of the bottle body 1 and the joining portion of the handle 11, and the displacement by the deflection in the direction weakening the joining force of the assembly beams 13 of the handle 11.

Thereby, the strong joint of the handle 11 to the bottle body can be stably maintained and the joint of the handle 11 to the bottle body 1 can be strongly and securely maintained over a long period of time.

In the third embodiment, the engagement which the upper end of the engaging piece 15 of the handle 11 is in contact with the stopping end 9 of the engaging groove 8 of the bottle body 1 not only securely prevents the handle 11 from slipping upwardly and coming off the bottle body 1 but also strongly reinforces a function for preventing the joint by the engagement between the engaging recesses 20 and the projecting pieces 22 from weakening.

The engagement which the supporting protuberances 10 are in contact with the outer surface of the assembly beams 13 not only prevents the widening and displacement toward the outer side of the assembly beams 13 but also strongly reinforces a function for preventing the joint by the engagement between the engaging recesses 20 and the projecting pieces 22 from weakening.

[Fourth Embodiment]

A fourth embodiment of the present invention will be described with reference to FIGS. 16~23. The description below will be made as regard to the differences between the fourth embodiment and the first embodiment and omitted in part by using same reference numerals for designating the same parts as that of the first embodiment.

The recessed portion 3 of the bottle body 1 has a flat surface of which a central portion except the upper and lower end portions stands.

The bulge pieces 7 are disposed to the central portion of the vertical protruding portion 5 at the both projecting end sides thereof. A plurality of engaging recesses 24 each having a bottom and of which apertures are contracted by edge portions 23 disposed at opening sides are formed at the side of the central portion of the bulge pieces 7 in the recessed bottom surface 4. The engaging recesses 24 constitute a supplementary engaging hole portion.

The supporting protuberances 10 contacting the outer surfaces of the assembly beams 13 of the handle 11 are convexly disposed on the recessed bottom portion 4 positioned at the side of the engaging recesses 24.

In the fourth embodiment, the engaging grooves 8 including the bulge pieces 7, the engaging recesses 24 having the edge portions 23, and the supporting protuberances 10 constitute the joining portion at the bottle body 1 side.

The tip surfaces 14 of the assembly beams 13 contacting the central portion of the recessed bottom surface 4 each have a flat surface as well as the central portion of the recessed bottom portion 4. Projecting pieces 25 are disposed on the central portion of the tip surfaces 14, respectively. Tip expanded portions 26 expanding vertically and inwardly are formed at the tip end of the projecting pieces 25, respectively. The projecting pieces 25 including the tip expanded portions 26 constitute a supplementary engaging projection.

The engaging pieces 15 engaging to the engaging grooves 8 of the bottle body 1 are disposed at the central portion of the sides of the assembly beams 13 facing each other.

In the fourth embodiment, the tip surfaces 14, engaging pieces 15, and the assembly beams 13 having the projecting pieces 25 constitute the joining portion at the handle 11 side.

Also in the fourth embodiment, the joint of the handle 11 to the bottle body 1 is accomplished by forming the bottle body 1 by biaxial oriented blow molding with the joining portion of the handle 11 as an insert.

Figure 18:
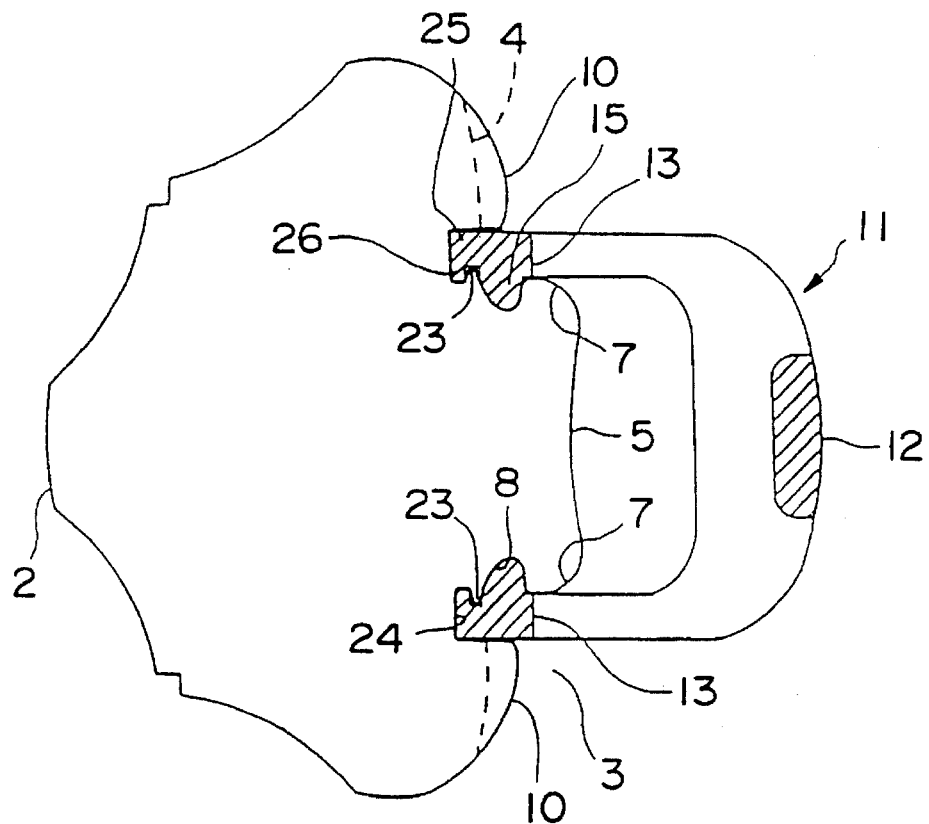
FIG. 18 an enlarged cross sectional view of the bottle taken along the line D—D of FIG. 16.
Figure 19:
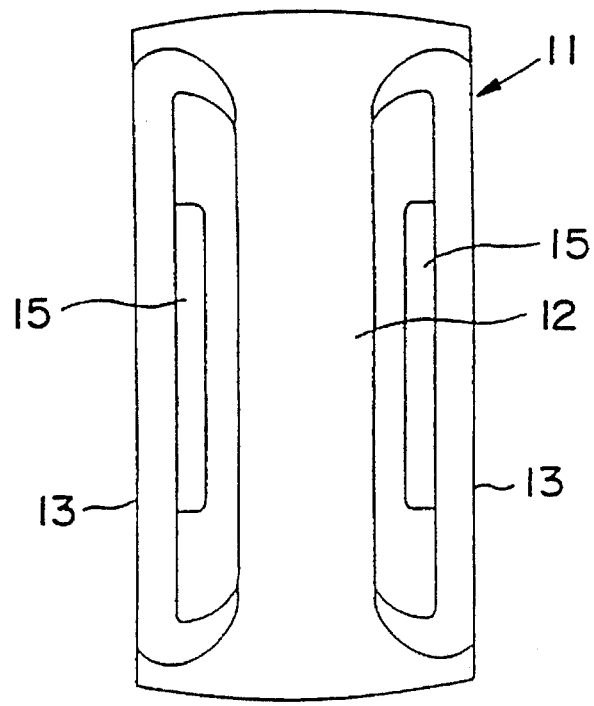
FIG. 19 is a rear view of the handle according to the fourth embodiment.
Figure 20:
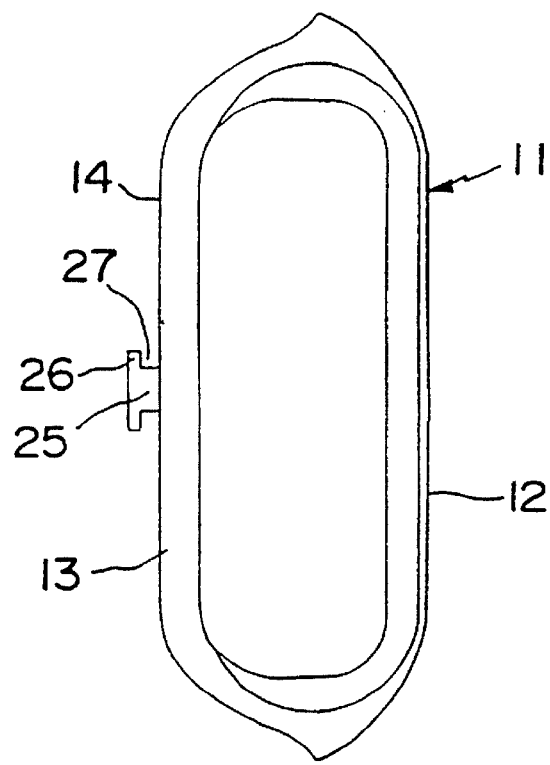
FIG. 20 is a side view of the handle according to the fourth embodiment.
Figure 21:
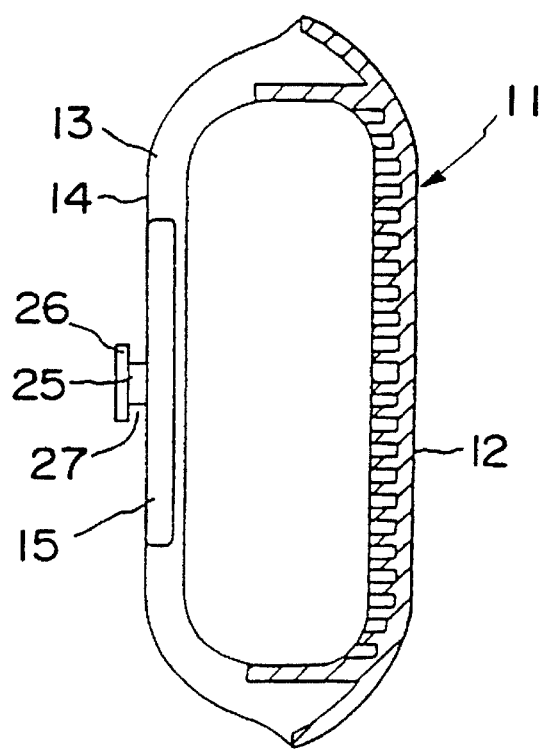
FIG. 21 is a longitudinal sectional view of the handle according to the fourth embodiment.

By forming the bottle body 1 by biaxial oriented blow molding with the joining portion of the handle 11 as the insert, the joining portion of the bottle body 1 is molded in a configuration wrapping the joining portion of the handle 11 and can engage with the joining portion of the handle 11 with substantially no space and with a large engaging force therebetween, as shown in FIG. 18.

The edge portions 23 of the engaging recesses 24 of the bottle body 1 engage with engaging grooves 27 formed on a portion of the projecting pieces 25 of the handle 11 to strongly prevent the projecting pieces 25 from coming off the engaging recesses 24. The engagement between the engaging grooves 8 and the engaging pieces 15 of the handle 11 can be stably maintained. Therefore, the joint of the handle 11 to the bottle body 1 becomes stable.

The tip surfaces 14 of the assembly beams 13 of the handle 11 each have a flat surface at the central portion thereof corresponding to the engaging piece 15 and the projecting pieces 25 are positioned at the central portion of the tip surface 14 so as to prevent the partial deformation of portion of the recessed bottom surface 4 provided with the engaging recesses 24 against external force applied during handling the bottle with the handle 11 gripped and to strongly and stably maintain the joint of the projecting pieces 25 to the engaging recesses 24.

As this embodiment, as the handle 11 has a symmetrical structure vertically and laterally, for joining the handle 11 as the insert to the biaxial oriented blow molding machine, only its front and back position of the handle 11 should be paid attention regardless of the up and down position of the handle 11 so that it becomes easy to handle the handle 11 during molding, thereby becoming easy to accomplish the automation of molding bottles.

Figure 22:
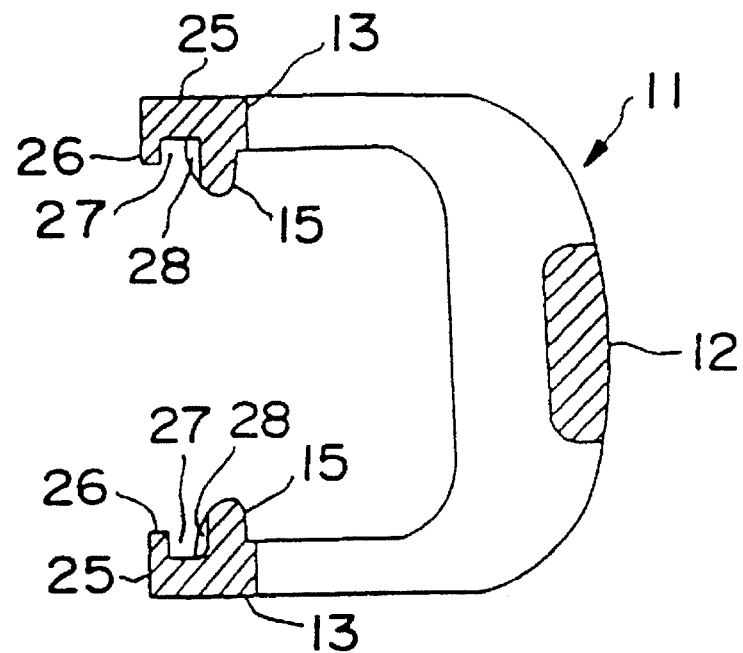
FIG. 22 is a cross sectional view of a variation of the handle according to the fourth embodiment.
Figure 23:
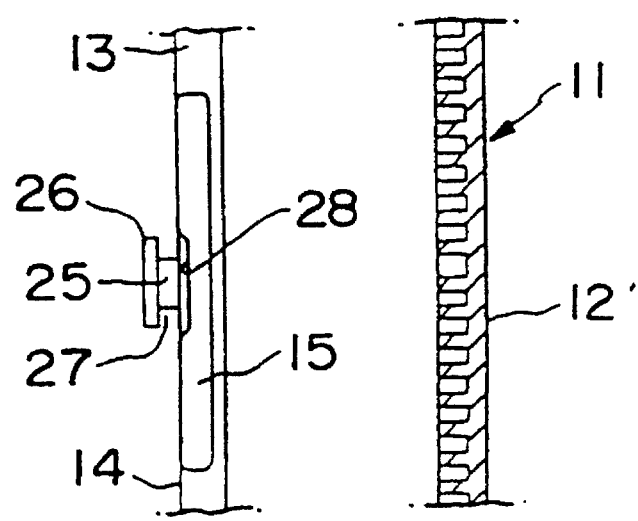
FIG. 23 is a partially longitudinal sectional view of the variation of the handle shown in FIG. 22.
Figure 24:
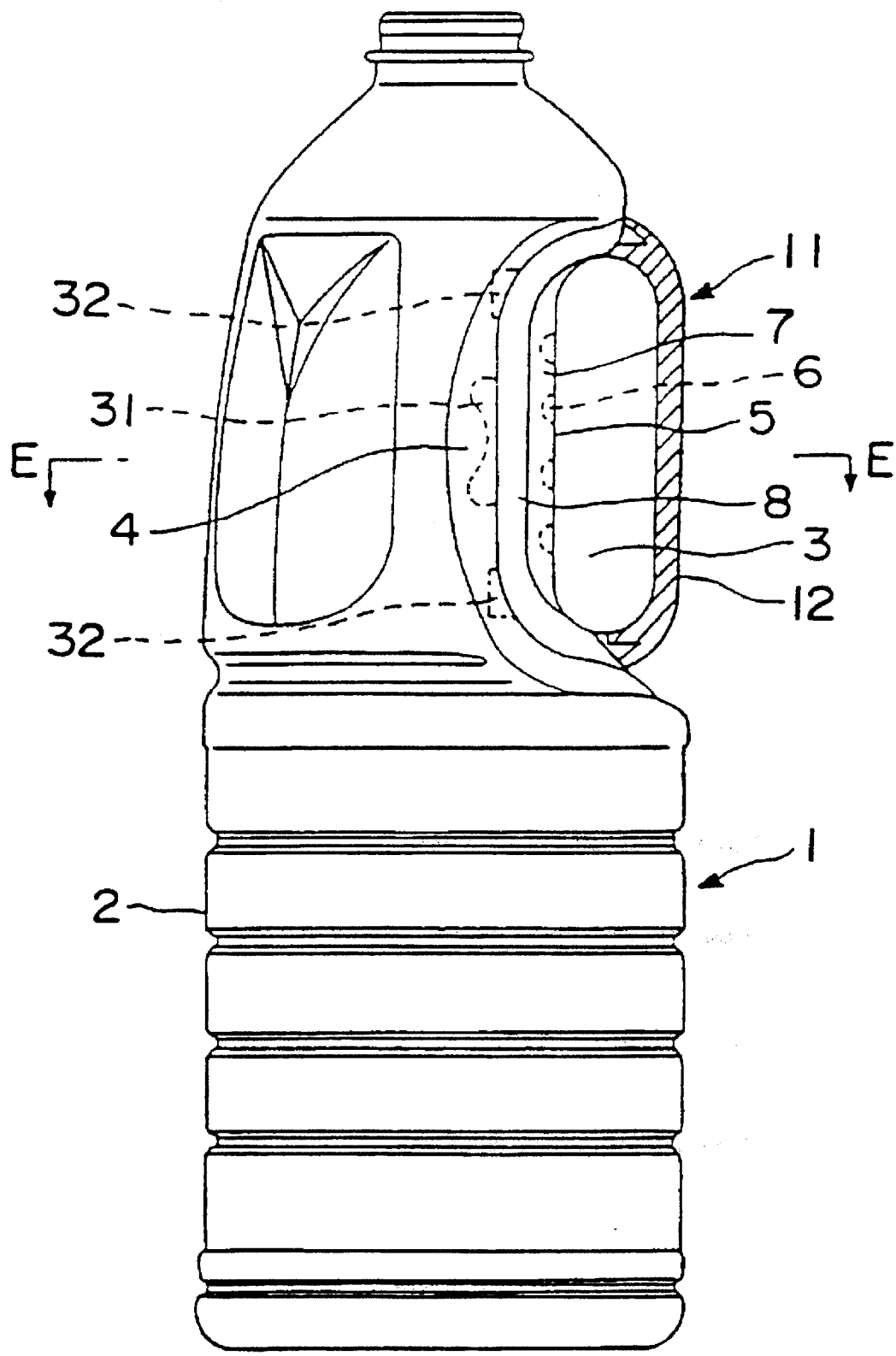
FIG. 24 is a view showing a fifth embodiment and a sixth embodiment of the present invention, which is a side view of a bottle having a handle of which a part is shown in section.
Figure 25:
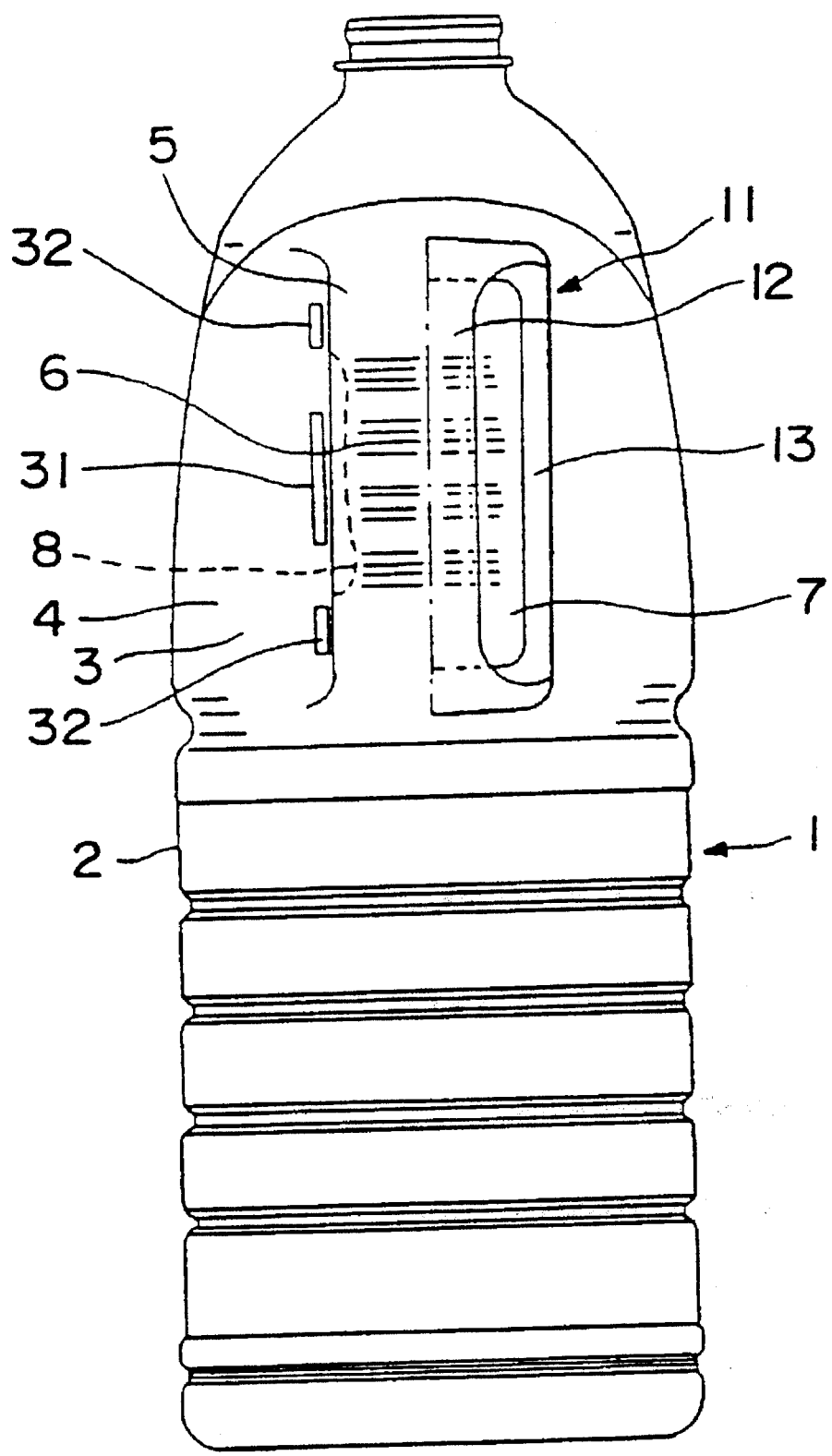
FIG. 25 is a view showing the fifth embodiment and the sixth embodiment of the present invention, which is a rear view of the bottle with the handle shown by deleting the left half of the handle.

As shown in FIG. 22 and FIG. 23, by providing notches 28 at the tip surface portion, opposing the tip expanded portions 26, of the engaging pieces 15 and increasing the width of the engaging grooves 27 disposed between the tip expanded portions 26 and the engaging pieces 15, the extending molding capability of the edge portions 23 engaging the engaging grooves 27 can be increased when the bottle body 1 is formed by biaxial oriented blow molding with the joining portion of the handle 11 as the insert.

[Fifth Embodiment]

A fifth embodiment of the present invention will be described with reference to FIGS. 24–29. The description below will be made as regard to the differences between the fifth embodiment and the fourth embodiment and omitted in part by using same reference numerals for designating the same parts as that of the fourth embodiment.

In the fifth embodiment, in stead of the engaging recesses 24 disposed on the bottle body 1 in the fourth embodiment, engaging recesses 31 each having a bottom are formed at the side of the central portion of the bulge pieces 7 on the recessed bottom surface 4 of the bottle body 1 and further engaging recesses 32 each having bottom are formed at a position vertically away from the engaging recesses 31. These engaging recesses 31 and 32 constitute a supplementary engaging hole portion.

A plurality (4 in the fifth embodiment) of reinforcing ribs 6 are disposed on a top wall of the vertical protruding portion 5 of the bottle body 1 in the same way as the first embodiment. The function of the reinforcing ribs 6 is same as that of the first embodiment.

In the fifth embodiment, the engaging grooves 8 including the bulge piece 7, the engaging recesses 31 and 32 constitute the joining portion of the bottle body 1 to the handle 11.

In the fifth embodiment, instead of the projecting pieces 25 disposed on the handle 11 in the fourth embodiment, projecting pieces 33 convexly disposed at the central portions of the tip surface 14 of the assembly beams 13 of the handle 11 and projecting pieces 35 formed in an square piece-like configuration at the tip surface of the assembly beams 13 i.e. the upper and lower end from where the assembly beams 13 are begun to curve. Relatively large dents 34 are formed on the projecting pieces 33 at the center thereof, respectively. The projecting pieces 33 and 35 constitute a supplementary engaging projection.

In the fifth embodiment, the tip surfaces 14, the engaging pieces 15, and the assembly beams 13 having the projecting pieces 33 and 35 constitute the joining portion at the handle 11 side.

Also in the fifth embodiment, the joint of the handle 11 to the bottle body 1 is accomplished by forming the bottle body 1 by biaxial oriented blow molding with the joining portion of the handle 11 as an insert.

Figure 26:
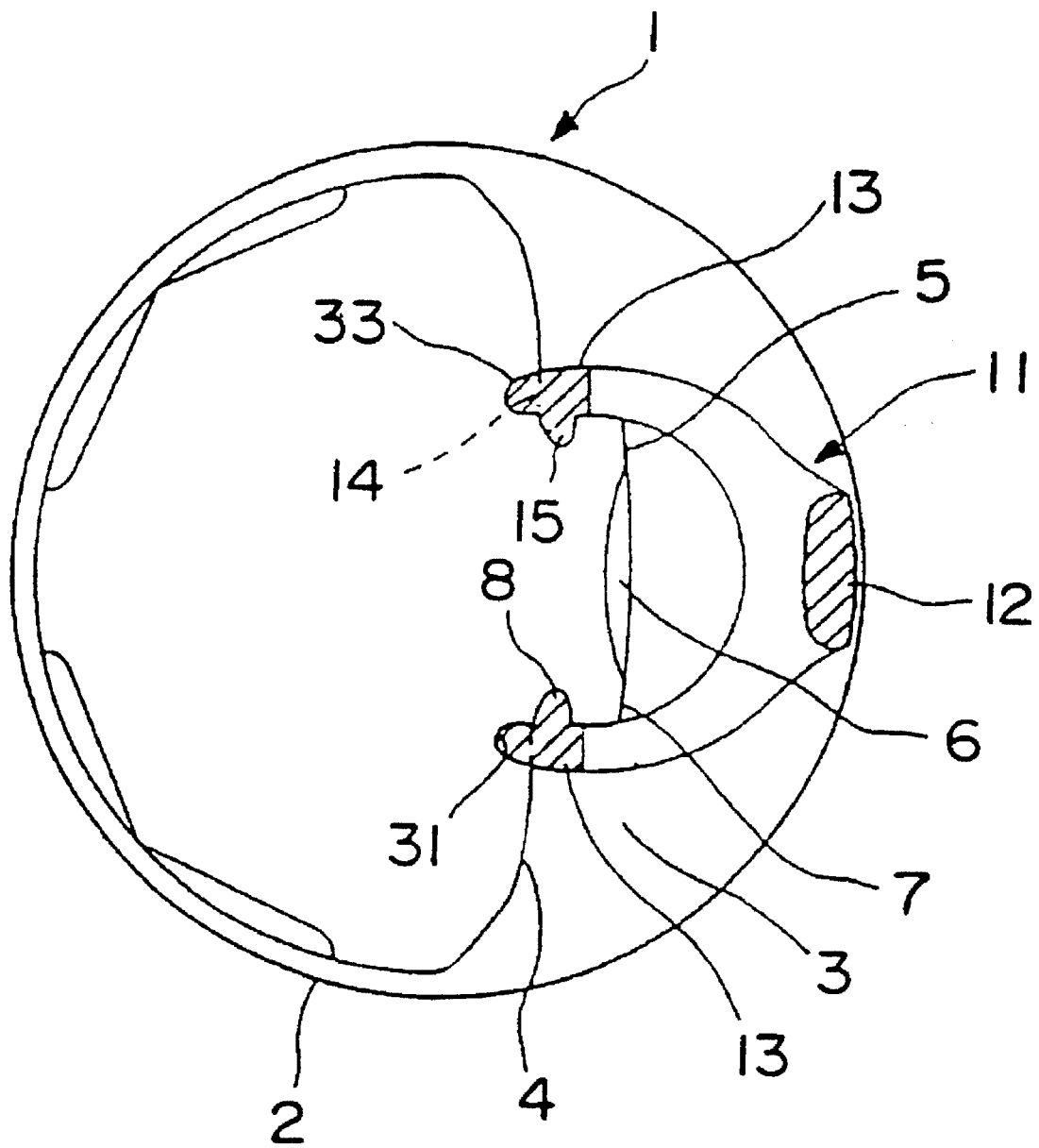
FIG. 26 an enlarged cross sectional view of the bottle taken along the line E—E of FIG. 24.
Figure 27:
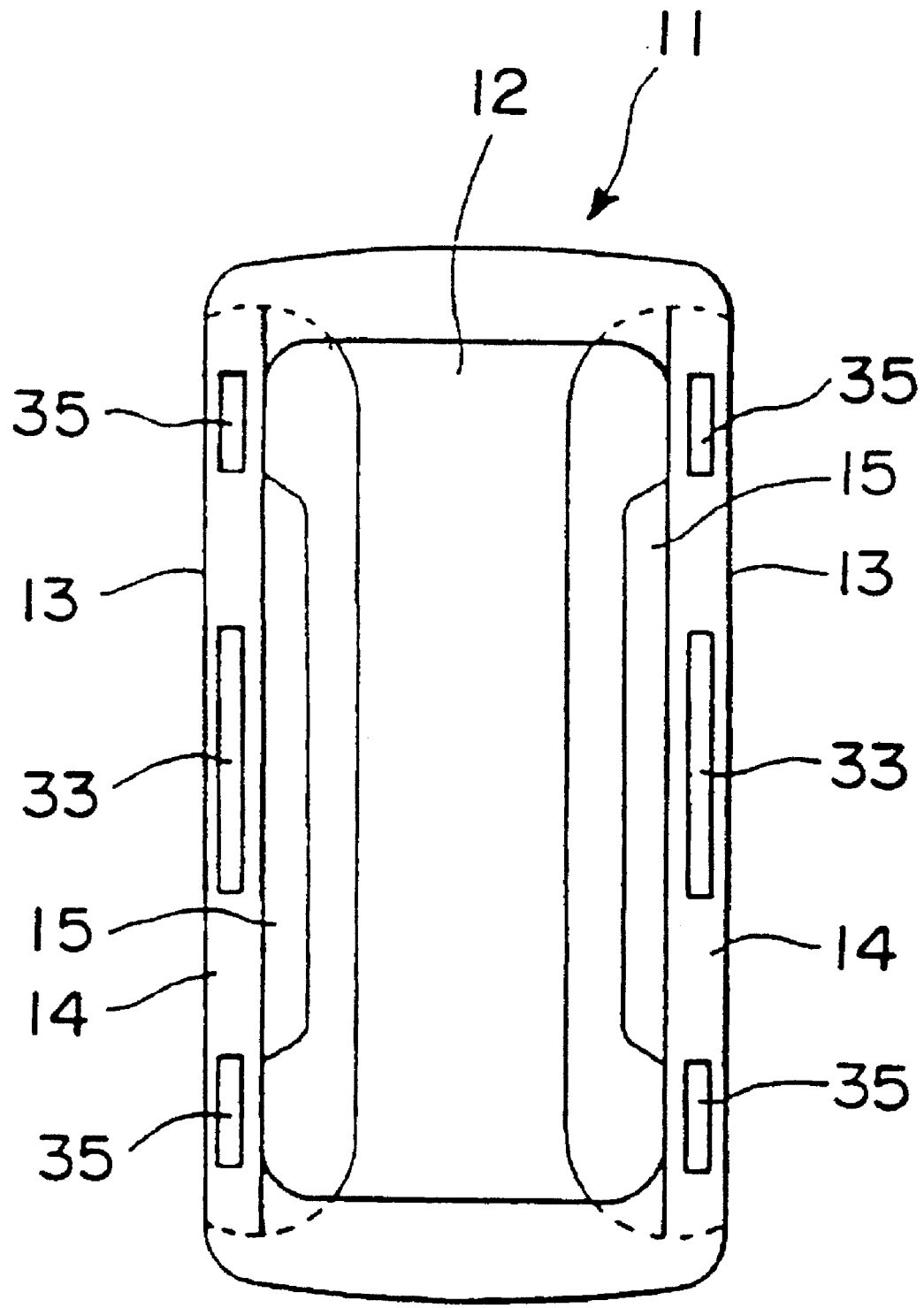
FIG. 27 is a front view of the handle according to the fifth embodiment and the sixth embodiment.
Figure 28:
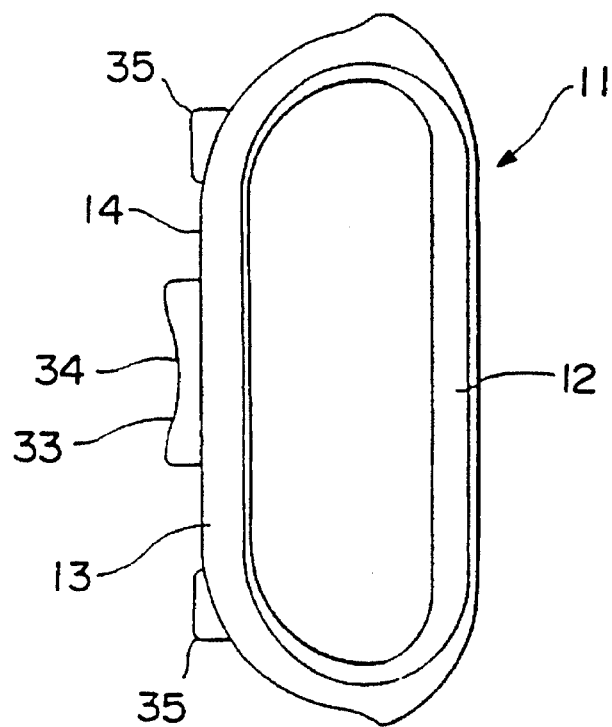
FIG. 28 is a side view of the handle according to the fifth embodiment and the sixth embodiment.
Figure 29:
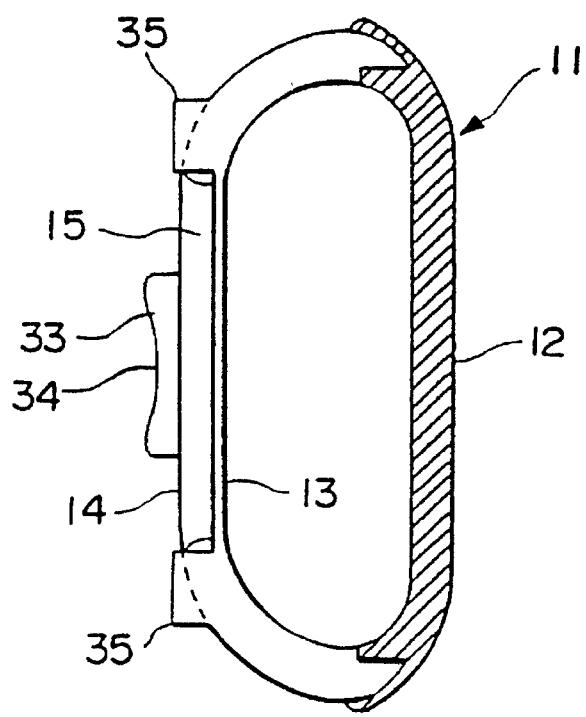
FIG. 29 is a longitudinal sectional view of the handle according to the fifth embodiment and the sixth embodiment.
Figure 30:
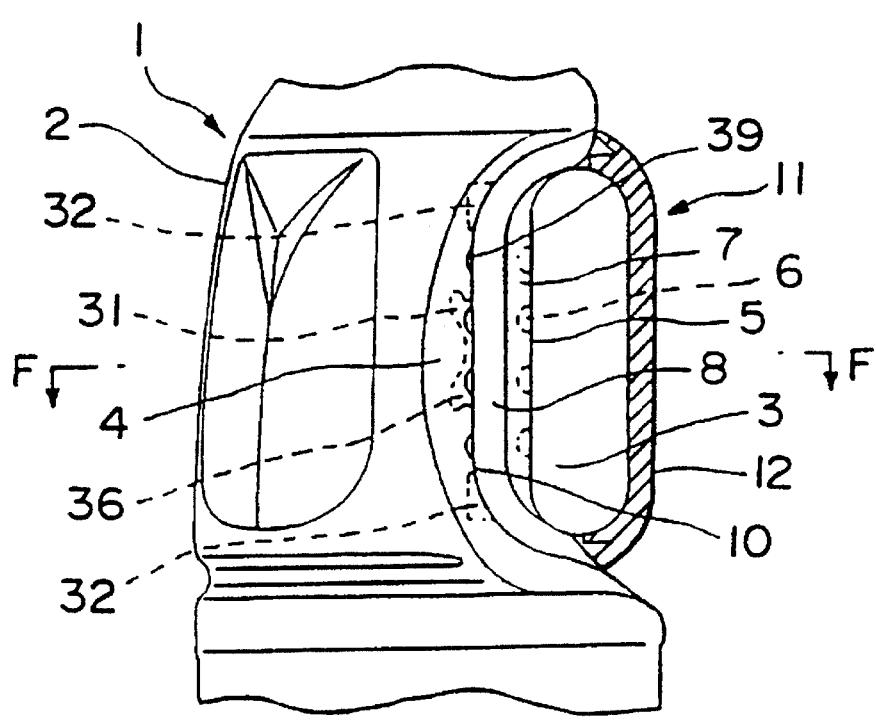
FIG. 30 is a view showing a seventh embodiment of the present invention, which is a partial side view of the bottle having a handle of which a part is shown in section.
Figure 31:
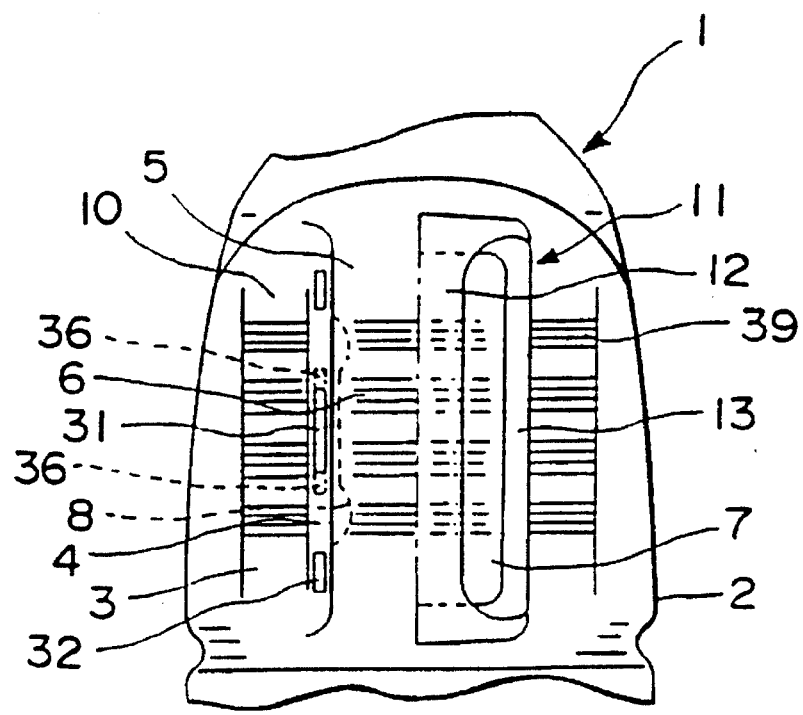
FIG. 31 is a view showing a seventh embodiment of the present invention, which is a partial rear view of the bottle with the handle shown by deleting the left half of the handle.
Figure 32:
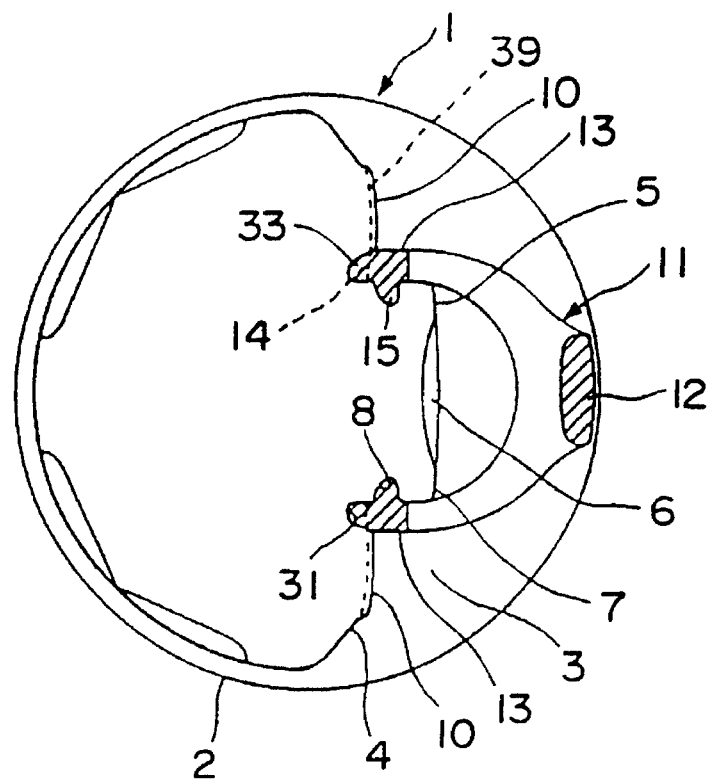
FIG. 32 is an enlarged sectional view of the bottle taken along the line F—F of FIG. 30.

By forming the bottle body 1 by biaxial oriented blow molding with the joining portion of the handle 11 as the insert, the joining portion of the bottle body 1 is molded in a configuration wrapping the joining portion of the handle 11 and can engage with the joining portion of the handle 11 with substantially no space and with a large engaging force therebetween, as shown in FIG. 26.

The engagement between the engaging recesses 31 of the bottle body 1 and the projecting pieces 33 of the handle 11, and the engagement between the engaging recesses 32 of the bottle body 1 and the projecting piece 35 of the handle 11 can stably maintain the engagement between the engaging grooves 8 of the bottle body 1 and the engaging piece 15 of the handle 11. Therefore, the joint of the handle 11 to the bottle body 1 becomes stable. As a result of this, the quite safe handling of the bottle with the handle 11 gripped can be accomplished.

The engagement between the engaging recesses 31 of the bottle body 1 and the projecting pieces 33 of the handle 11, and the engagement between the engaging recesses 32 of the bottle body 1 and the projecting piece 35 of the handle 11 can strongly and securely prevents the displacement by the deflection in the direction weakening the joining force between the joining portion of the bottle body 1 and the joining portion of the handle 11, and the displacement by the deflection in the direction weakening the joining force of the assembly beams 13 of the handle 11.

Thereby, the strong joint of the handle 11 to the bottle body can be stably maintained and the joint of the handle 11 to the bottle body 1 can be strongly and securely maintained over a long period of time.

The handle 11 is joined like a vertical beam in the recessed portion 3 of the bottle body 1 with the projecting pieces 35 engaging the engaging recesses 32 so that, when the bottle is loaded, the handle 11 supports part of the pushing force of the loading applied to the recessed portion 3, thereby, strongly reinforcing the recessed portion 3 which is easy to receive sinking deformation.

In state of heat filling of the content in the bottle body 1, the mechanical strength of the recessed portion 3 is weakened. However, the reinforcing function of the handle 11 securely prevents the buckling deformation of the recessed portion 3 and thereby allows safe handling of the bottle.

The joint of the handle 11 to the bottle body 1 is accomplished by the engagements between the engaging recesses 31 and 32 of the bottle body 1 and the projecting pieces 33 and 35 of the handle 11, respectively, so that the joining force between the handle 11 and the bottle body 1 is shared among the projecting pieces 33 at the center and to the projecting pieces 35 at the upper and lower sides. The sharing of the joining force provides the stable joint between the bottle body 1 and the handle 11 and provides more safe and stable handling of the bottle with the handle 11 gripped.

The dents 34 are formed on the projecting pieces of the handle 11 so as to prevent the bottle body 1 from turning to the poor-looking. In more detail, when the bottle body 1 is formed by biaxial oriented blow molding with the projecting pieces of the handle 11 as the insert in case where the projecting pieces 33 are provided with no dent 34, it is necessary to partially deform the portion, opposing the projecting pieces 33, of the bottle body 1 to extend the portion largely relative to the adjacent portion of the bottle body. However, the portion of the bottle body 1 can not be deformed enough because of partial deformation so as to cause the deformation to stop on its way, thereby turning to the poor-looking.

However, by forming the dents 34 on the projecting pieces 33, the amount of stretching of the portion, opposing the projecting pieces 33, of the bottle body 1 can be allowed to be near the amount of stretching of the adjacent portion, thereby providing irregular deformation such as "molding sink" which appears in a lateral groove-like shape on the portion, opposing the projecting pieces 33, of the bottle body, in particularly at the side of the supporting projection 10.

[Sixth Embodiment]

The basic components of a bottle of a sixth embodiment are completely same as the that of the bottle of the fifth embodiment. The description below will be made to help the explanation of the drawings (FIGS. 24–29) of the fifth embodiment.

In the sixth embodiment, for setting the stretch ratio of thickness of the vertical protruding portion 5 to that of the other part of the bottle body 1 to be more than 5, the reinforcing ribs 6 disposed on the vertical protruding portion 5 is molded to have 3–4 mm in depth. In the sixth embodiment, only this point is different from the fifth embodiment.

The vertical protruding portion 5 of the bottle body 1 is a portion where is difficult to receive the amount of stretching because of the short distance from an extension axis of the bottle body 1 in the radical direction and therefore where is easy to produce heat deformation during the heating process such as a heat set due to the lack of amount of stretching.

However, by providing the reinforcing ribs 6 to the vertical protruding portion 5, the amount of stretching of the vertical protruding portion 5 can be increased to a range where no heat deformation is occurred.

By forming the reinforcing ribs 6 to have a predetermined depth, the stretch ratio of thickness of the vertical protruding portion 5 to that of the other part of the bottle body 1 is set to be more than 5 so as to increase the heat resistance of the vertical protruding portion 5 against the heat of the heat set. Thereby, it can prevent the heat deformation of the vertical protruding portion 5 by the heat set when the bottle body 1 is formed by biaxial oriented blow molding.

The stretch ratio of thickness of the vertical protruding portion 5 is preferably set to more than 6.

[Seventh Embodiment]

Hereinafter, a seventh embodiment of the present invention will be described with reference to FIGS. 30–36. Since the basic components of the seventh embodiment are same as that of the fifth embodiment, the description will be made as regard to the differences between the seventh embodiment and the fifth embodiment and omitted in part by using same reference numerals for designating the same parts as that of the fifth embodiment.

Edge portions 36 are disposed to the opening edges of the engaging recesses 31 of the bottle body 1, respectively, so that the apertures of the engaging recesses 31 are contracted by the edge portions 36. Engaging grooves 37 into which the edge portions 36 of the bottle body 1 are engaged are concavely disposed to the upper and lower proximal ends of the projecting pieces 33 of the handle 17, respectively. Tip expanded portions 38 are formed at the tip end of the projecting pieces 33, respectively.

Figure 33:
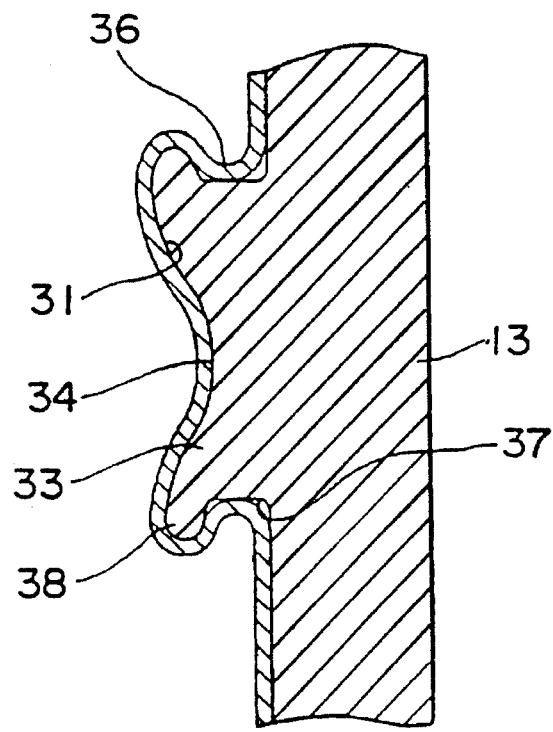
FIG. 33 is a enlarged partial longitudinal sectional view showing an joined state between an engaging recess of a bottle body and an engaging projection of the handle.
Figure 34:
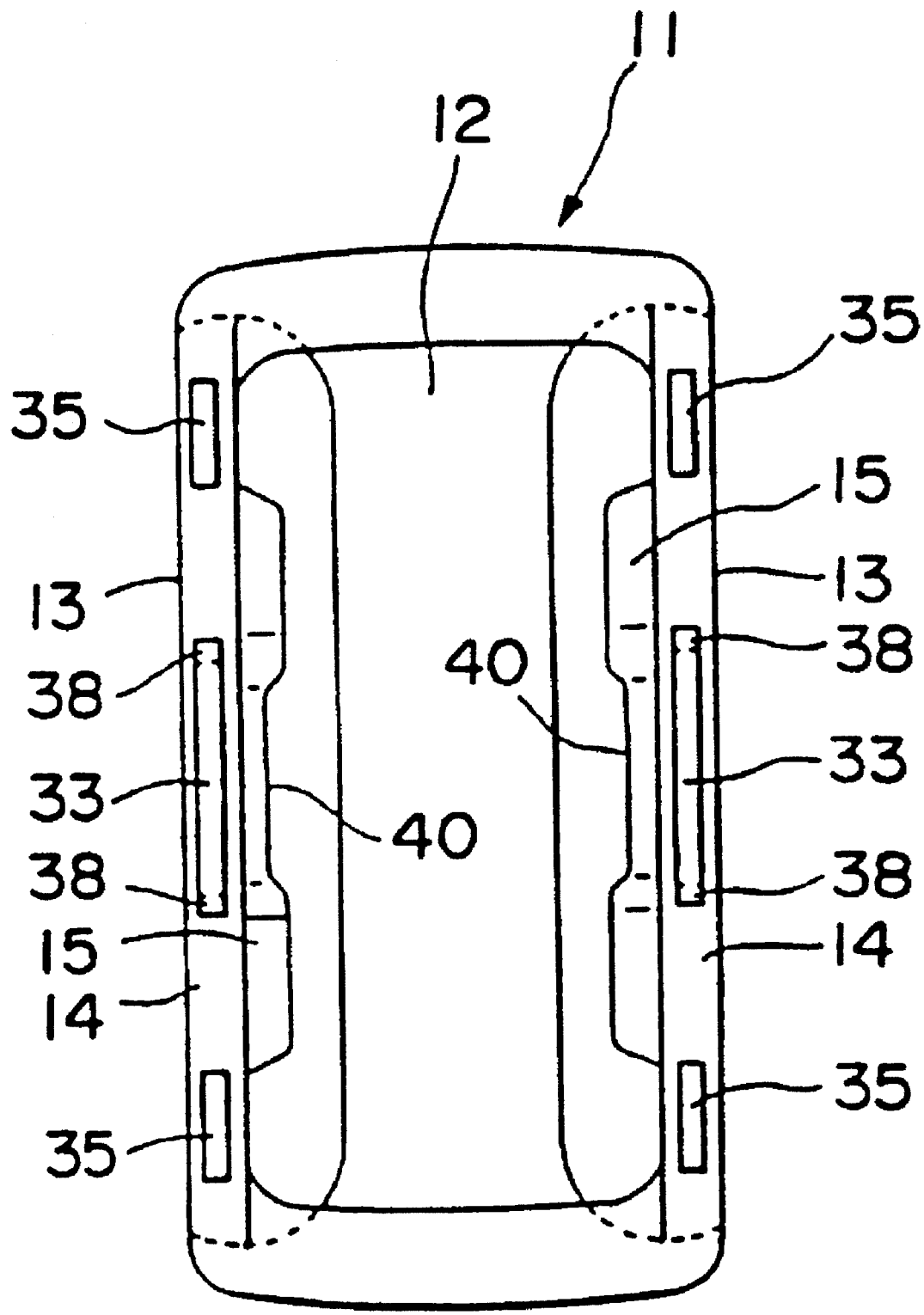
FIG. 34 is a front view of the handle according to the seventh embodiment.
Figure 35:
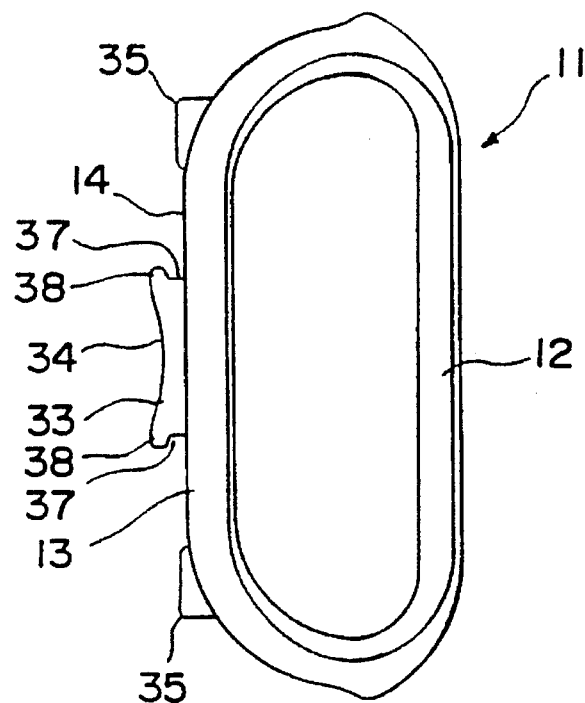
FIG. 35 is a side view of the handle according to the seventh embodiment.
Figure 36:
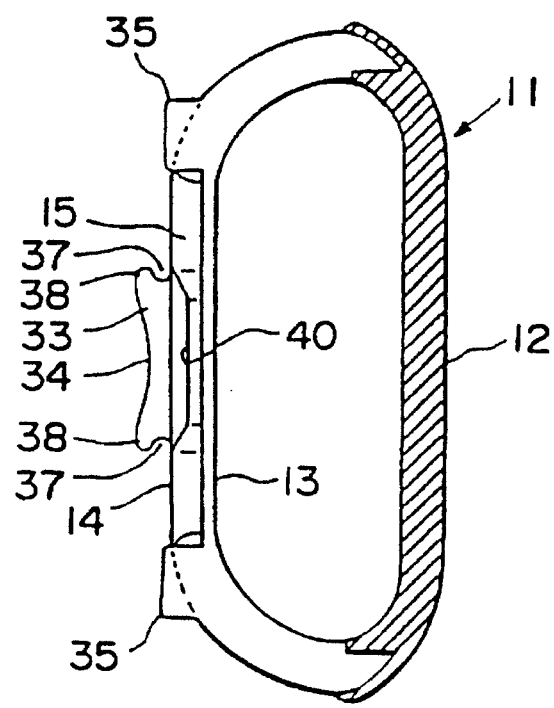
FIG. 36 is a longitudinal sectional view of the handle according to the seventh embodiment.

As shown in FIG. 33, when the projecting pieces 33 of the handle 11 are engaged to the engaging recesses 31 of the bottle body 1, the edge portion 36 of the bottle body 1 engage with the engaging grooves 37 of the projecting pieces 33 and the tip expanded portions 38 of the projecting pieces 33 strongly engage with the edge portions 36. Thereby, the handle 11 is joined to the bottle body not to be detachable.

A plurality of irregularities 39 are laterally formed on the supporting protuberances 10 of the bottle body 1. The irregularities 39 not only increase the mechanical strength of the supporting protuberances 10 but also prevent the bottle body 1 from turning to the poor-looking.

In more detail, as the bottle body 1 is formed by biaxial oriented blow molding with the projecting pieces 33 of the handle 11 as the insert, the extension deformation are not accomplished completely at the portion of the recessed bottom surface 4 adjacent to the engaging hole 31 into which the projecting piece 33 is engaged, thereby sometime providing irregular deformation formed in a lateral groove-like configuration such as "molding sink". Therefore, as the plurality of irregularities 39 each formed a lateral groove-like configuration are previously formed on the supporting protuberances 10 of the bottle body 1, even when the irregular deformation formed in a lateral groove-like configuration is formed as mentioned above, the irregular deformation becomes a part of the irregularities 39 of the supporting protuberances 10, thereby having little or no effect on its profile of the bottle body 1.

Constricted portions 40 for decreasing the projecting height and thickness of the engaging pieces 15 are formed on the central portion, opposing the engaging concave portion 16 16, in the engaging pieces 15 of the handle 11. The constricted portions 40 prevent the bottle body 1 from turning to the poor-looking.

In more detail, when the bottle body 1 is formed by biaxial oriented blow molding with the projecting pieces 33 of the handle 11 as the insert, it is necessary to partially deform the portion, opposing the projecting pieces 33, of the bottle body 1 to extend the portion largely relative to the adjacent portion of the bottle body. However, the portion of the bottle body 1 can not be deformed enough because of partial deformation so as to cause the deformation to stop on its way, thereby turning to the poor-looking.

However, by providing the constricted portions 40 to the engaging pieces 15, the amount of stretching necessary for forming the portion, opposing the projecting pieces 33, of the bottle body 1 becomes small so that the amount of stretching for the portion of the bottle body 1 becomes substantially same as that of the adjacent portion. Thereby, the portion, opposing the constricted portions 40 of the engaging pieces 15, of the bulge pieces 7 of the bottle body 1 can be prevented from becoming in irregular deformation such as "molding sink".

In the seventh embodiment, the joining portion of the bottle body 1 to the handle 11 comprises the engaging grooves 8 including the bulge pieces 7, the engaging recesses 31 including the edge portions 36, engaging recesses 32, and the supporting protuberances 10. The joining portion of the handle 11 to the bottle body 1 comprises the tip surfaces 14, the engaging pieces 15, and the assembly beams 13 having the projecting pieces 33, having the tip expanded portions 38, and the projecting pieces 35.

[Eighth Embodiment]

Figure 37:
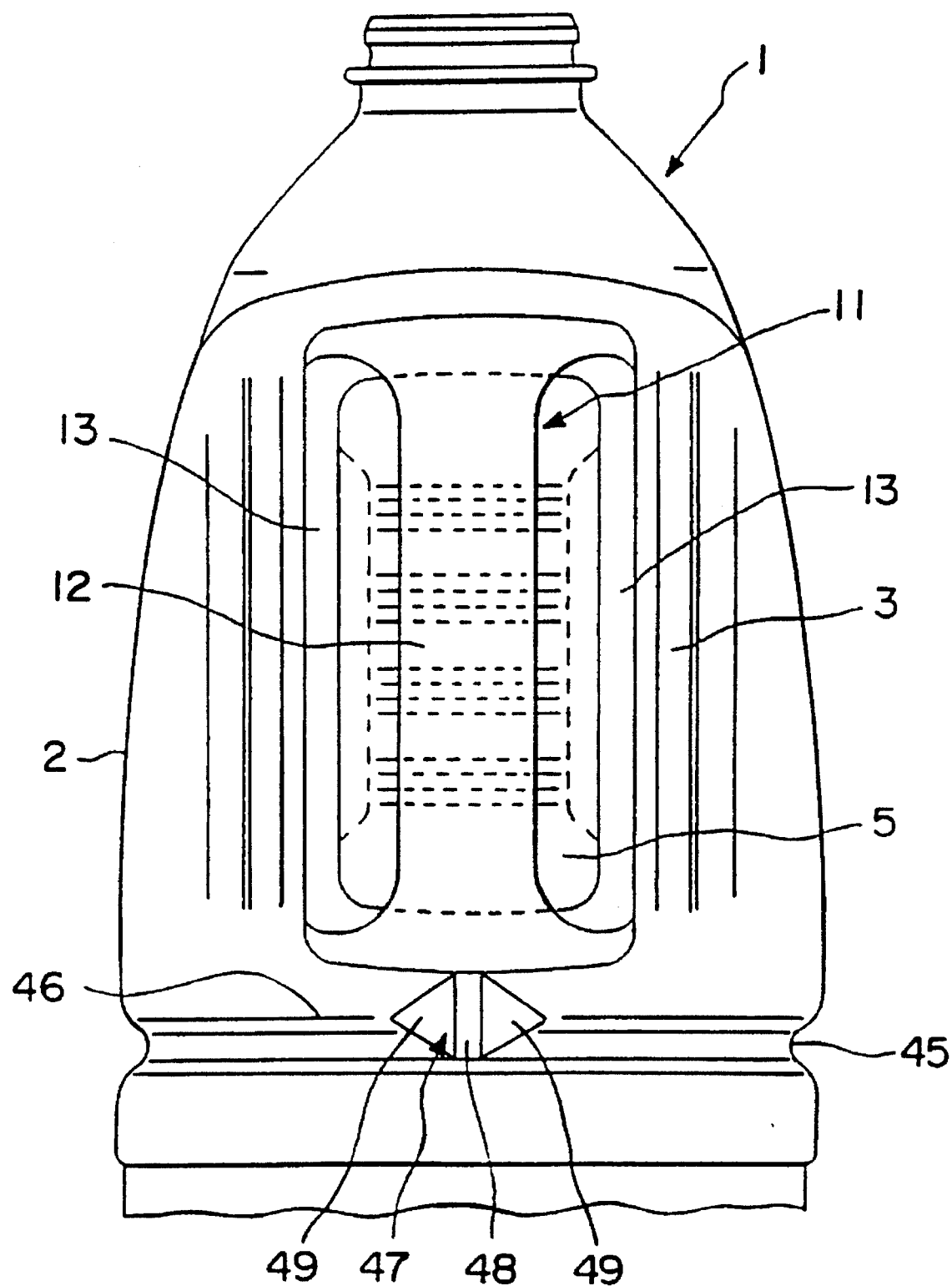
FIG. 37 is a view showing a eighth embodiment of the present invention, which is a partial rear view of the bottle.
Figure 38:
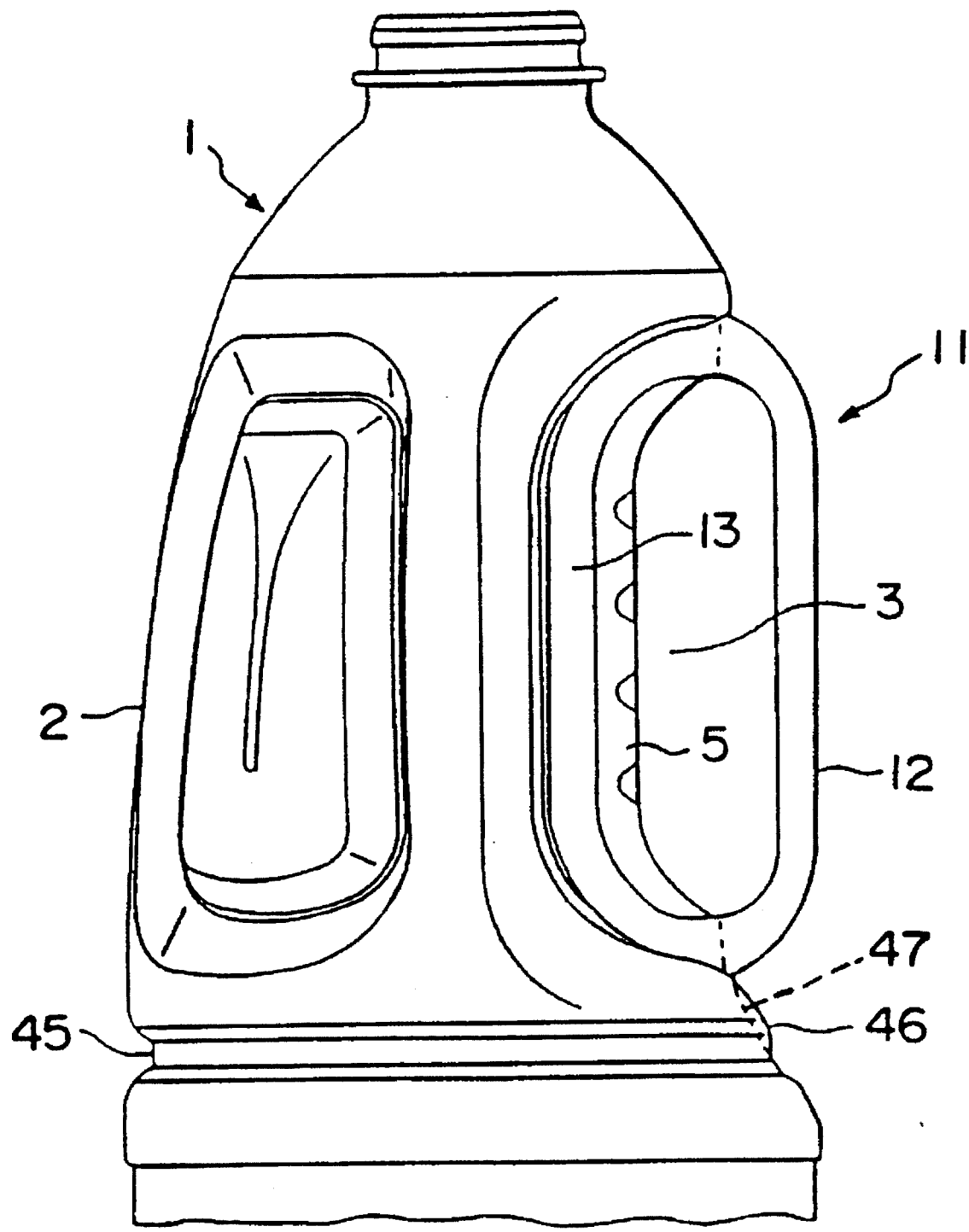
FIG. 38 is a view showing a eighth embodiment of the present invention, which is a partial side view of the bottle.

Hereinafter, an eighth embodiment of the present invention will be described with reference to FIG. 37 and FIG. 38. Since a joining structure of a bottle body 1 and a handle 11 in this embodiment are same as that of the fifth embodiment mentioned above, the description will be omitted in part by using same reference numerals for designating the same parts as that of the fifth embodiment and will be made as regard to the differences between the eighth embodiment and the fifth embodiment.

A circular peripheral groove 45 is concavely formed on the body portion 2 of the bottle body 1 slightly under the recessed portion 3. The lower end of the recessed portion 3 connects to the peripheral groove 45 by a protuberance 46 projecting and curved outwardly.

A vertical groove 47 crossing over the protuberance 46 is concavely disposed on the center of the protuberance 46. The vertical groove 47 comprises a bottom wall 48 extending flat from the lower edge of the recessed portion 3 to a bottom wall of the peripheral groove 45 and side walls 49 formed in tapering-surface configuration which standing up from both side edges of the bottom wall 48 to the protuberance 46.

When handling the bottle with the handle 11 gripped, the loading is intensively applied to the protuberance 46 just under the recessed portion 3. At this stage, the bottle body 1 is in state of decreasing the inner pressure. As a result of this, the protuberance 46 is applied with force for deforming the protuberance 46 inwardly.

However, the vertical groove 47 is already formed concavely on the protuberance 46 so that the side walls 49 of the vertical groove 47 operates as a reinforcing rib against the force for deforming the protuberance 46 inwardly, thereby increasing the mechanical strength of the protuberance 46 and preventing the protuberance 46 from permanently deforming. Therefore, the bottle body can keep in its shape to maintain the value as goods of the bottle with a handle high.

Since no deformation at the protuberance 46 occurs, the joint of the handling 11 to the bottle body can be constantly and stably maintained, thereby providing convenient and stable handling of the bottle with the handle 11 gripped.

The formation of the vertical groove 47 can be accomplished by little modification to an existing molding machine and can be easily performed at a low cost.

[Ninth Embodiment]

Figure 39:
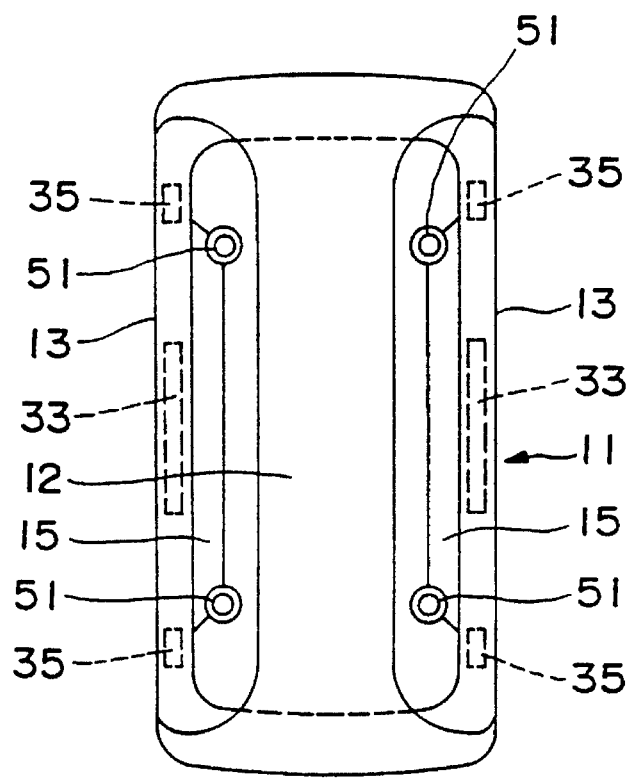
FIG. 39 is a rear view of the handle according to a ninth embodiment of the present invention.
Figure 40:
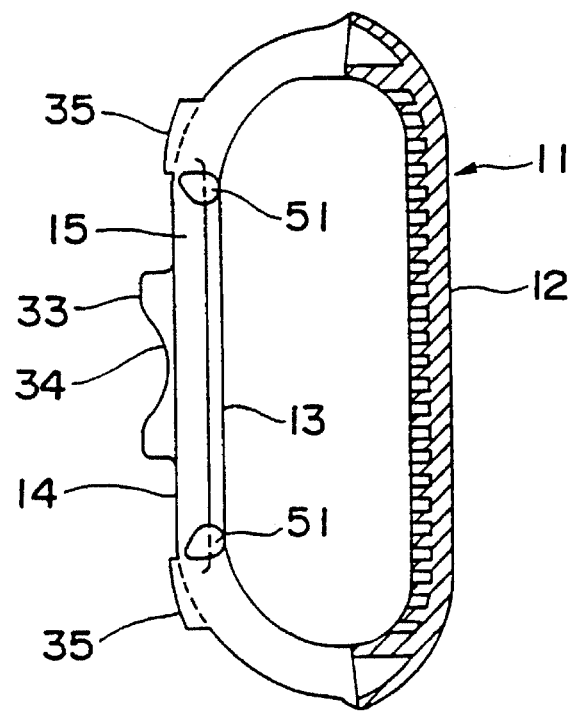
FIG. 40 is a longitudinal sectional view of a handle according to a ninth embodiment of the present invention.

Hereinafter, a ninth embodiment of the present invention will be described with reference to FIGS. 39, 40, and 41. A bottle with a handle according to the ninth embodiment is accomplished by adding some components to the bottle with a handle according to the fifth embodiment. The description will be omitted in part by using same reference numerals for designating the same parts as that of the fifth embodiment and will be made as regard to the differences between the ninth embodiment and the fifth embodiment.

In the handle 11 of the ninth embodiment, engaging pins 51 are disposed to upper and lower both ends of the engaging pieces 15, respectively, and positioned to be oppose to each other. The engaging pins 51 protrude inwardly than the inner surface of the engaging pieces 15. The tips of the engaging pins 51 extend in the direction opposite to the projecting direction of the projecting pieces 33 and the projecting pieces 35, that is, in the direction closing to the handle plate 12 of the handle 11.

In the ninth embodiment, the projecting pieces 33 and 35 and the engaging pins 51 constitute a supplementary projection.

In the ninth embodiment, the joining portion at the handle 11 side comprises the tip surfaces 14, the engaging pieces 15 having the engaging pins 51, and the assembly beams 13 having the projecting pieces 33 and the projecting pieces 35.

Figure 41:
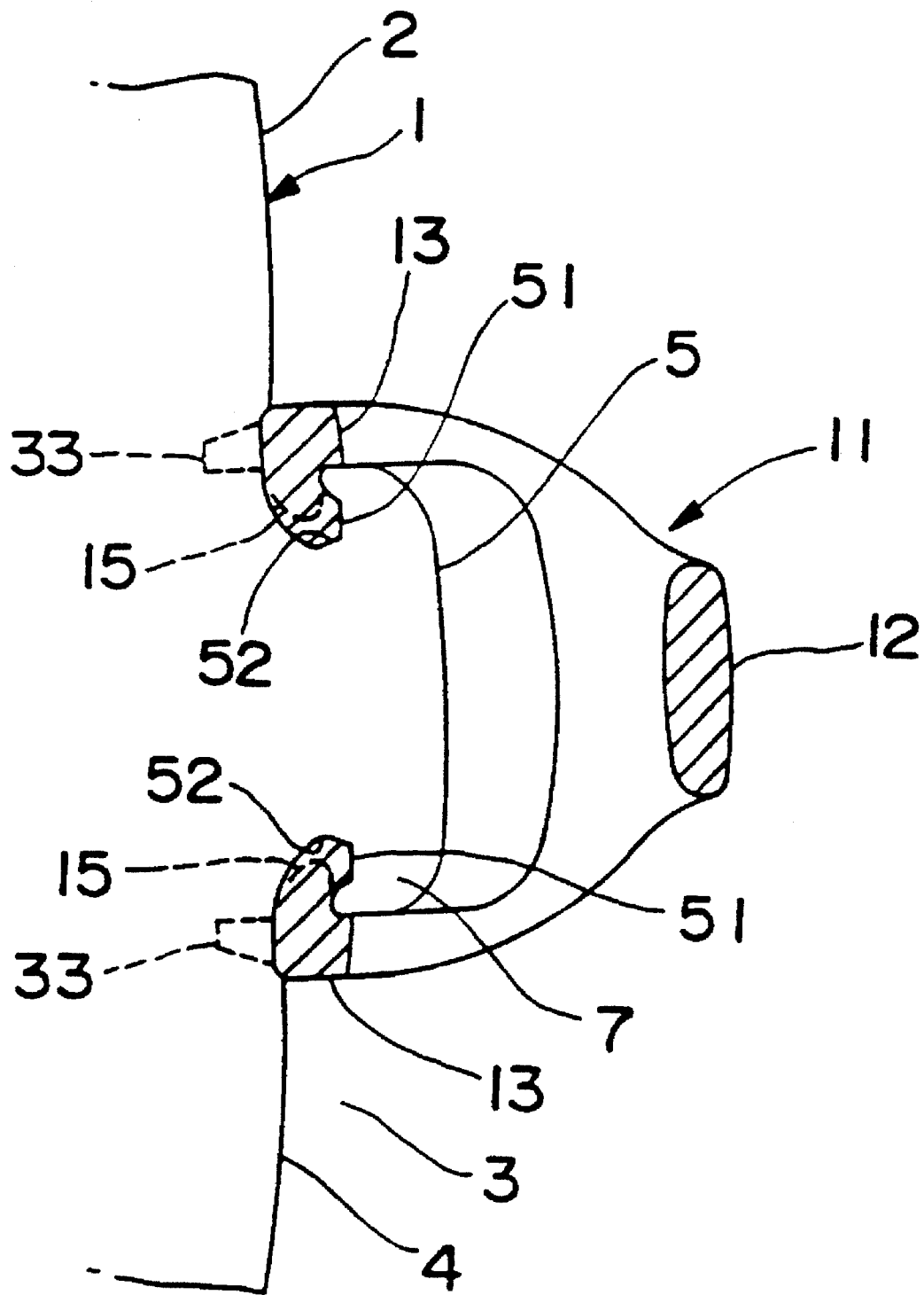
FIG. 41 is a view showing the ninth embodiment of the present invention, which is an enlarged cross sectional view of a partial part on the joint between a bottle body and the handle.
Figure 42:
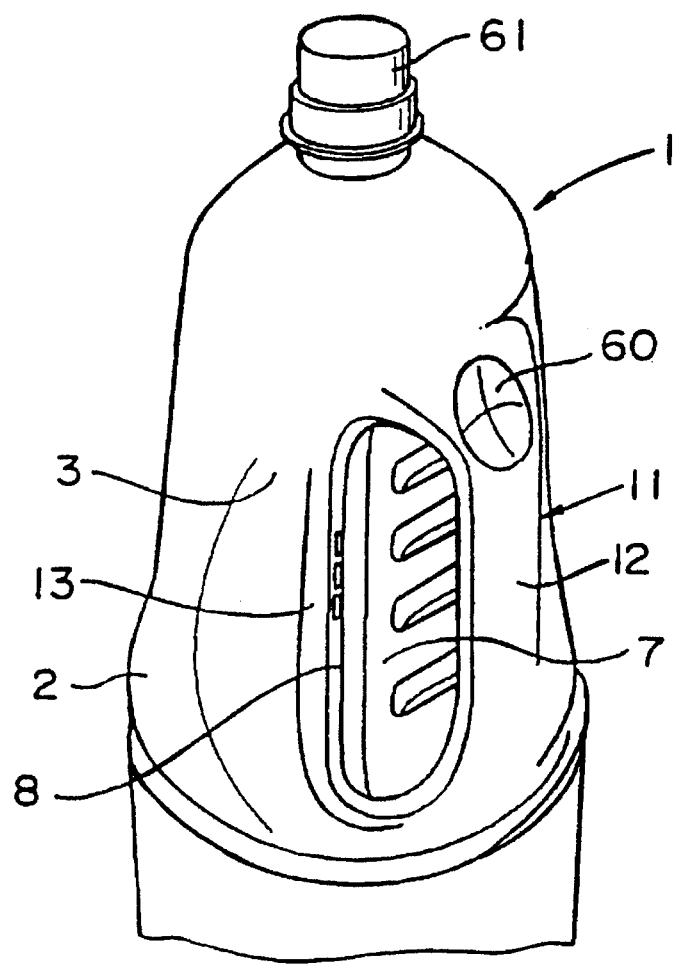
FIG. 42 is a view showing a tenth embodiment of the present invention, which is a perspective view of a partial part of a bottle.
Figure 43:
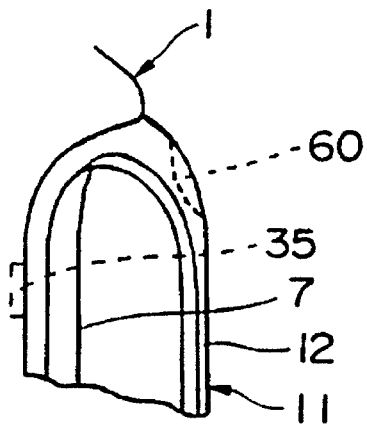
FIG. 43 is an enlarged side view of a joint of the bottle to a handle.
Figure 44:
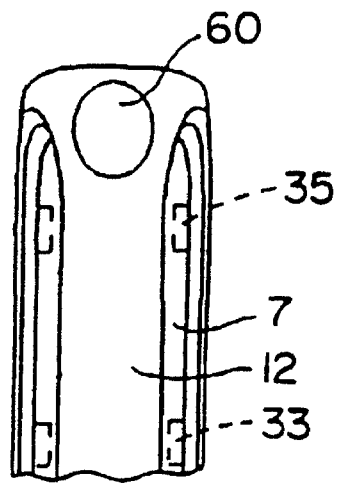
FIG. 44 is a partial rear view of the handle according to the tenth embodiment.

When the bottle body 1 is formed by biaxial oriented blow molding with the joining portion of the handle 11 as the insert, the joining portion of the bottle body 1 is molded in a configuration wrapping the joining portion of the handle 11 and the engaging pins 51 engage into engaging recessed portions 52 formed to the bottle body 1, as shown in FIG. 41. In the ninth embodiment, the engaging recesses 31 and 32 and the engaging recessed portions 52 constitute a supplementary engaging hole portion.

In the ninth embodiment, the joining portion of the bottle body 1 to the handle 11 comprises the engaging grooves including the bulge pieces 7, the engaging recesses 31 and 32, and the engaging recessed portion 52.

In this manner, by providing the engaging pins 51 protruding in the direction opposite to the projecting direction of the projecting pieces 33 and 35, the joining force between the bottle body and handle 11 becomes stronger, thereby strongly preventing the handle 11 from coming off the bottle body 1.

Thereby, after filling the content in the bottle body 1 and closing the bottle body 1, the handle 11 is prevented from coming off the bottle body 1 even when the inner pressure of the bottle body 1 is rapidly increased by such as falling. This is quite effective in case of the bottle body 1 having a large capacity such as 4 or more liters.

[Tenth Embodiment]

Hereinafter, a tenth embodiment of the present invention will be described with reference to FIGS. 42–46. Since a joining structure of a bottle body 1 and a handle 11 in this embodiment are same as that of the fifth embodiment mentioned above, the description will be omitted in part by using same reference numerals for designating the same parts as that of the fifth embodiment and will be made as regard to the differences between the tenth embodiment and the fifth embodiment.

In the handle 11 of this embodiment, a recessed portion 60 for receiving user's finger is formed on an outer surface of an upper corner portion of the handle plate 12 of the handle 11. The recessed portion 60 is formed in a circular or oval shape as taken from the front side and comprises a concavely curved wall.

Figure 45:
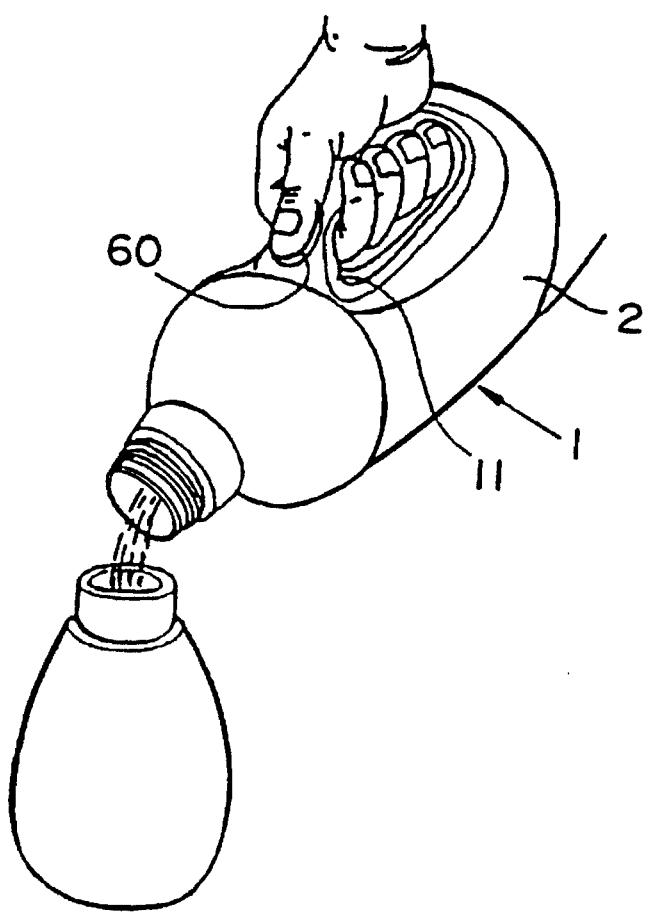
FIG. 45 is a perspective view showing the used state of the bottle of the tenth embodiment.

As shown in FIG. 45, the recessed portion 60 is positioned to be naturally contacted with the user's thumb when the user handles the bottle with the handle 11 gripped and is formed in a configuration to fit the digital pulp of thumb. As result of this, even when the bottle body 1 has a large capacity, the user can easily pour the content without applying useless force after taking off a cap 61.

Figure 46:
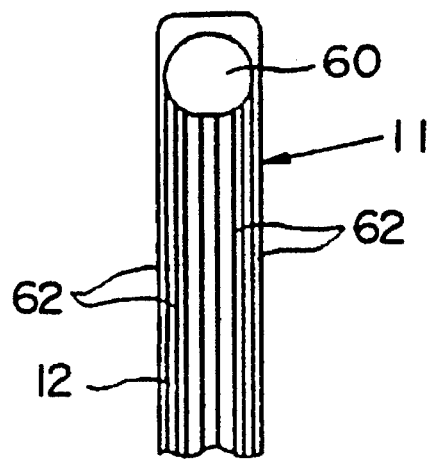
FIG. 46 is partial rear view showing a variation of the handle according to the tenth embodiment.

FIG. 46 shows a variation of this embodiment in which a plurality of vertical ribs 62 are disposed on the outer surface of the handle plate 12 of the handle 11.

To form the recessed portion 60 to the handle 11 may be employed to any other embodiments from first embodiment to the ninth embodiment described above.

[Eleventh Embodiment]

Hereinafter, a eleventh embodiment of the present invention will be described with reference to FIG. 47. Since a joining structure of a bottle body 1 and a handle 11 in this embodiment are same as that of the first embodiment mentioned above, the description will be omitted in part by using same reference numerals for designating the same parts as that of the first embodiment and will be made as regard to the differences between the eleventh embodiment and the first embodiment.

The aspect of the eleventh embodiment is that the relative position between a preform 70 as a material of the bottle body 1 and handle 11 are set as follows when the bottle body 1 is formed by biaxial oriented blow molding with the joining portion of the handle 11 as the insert.

Figure 47:
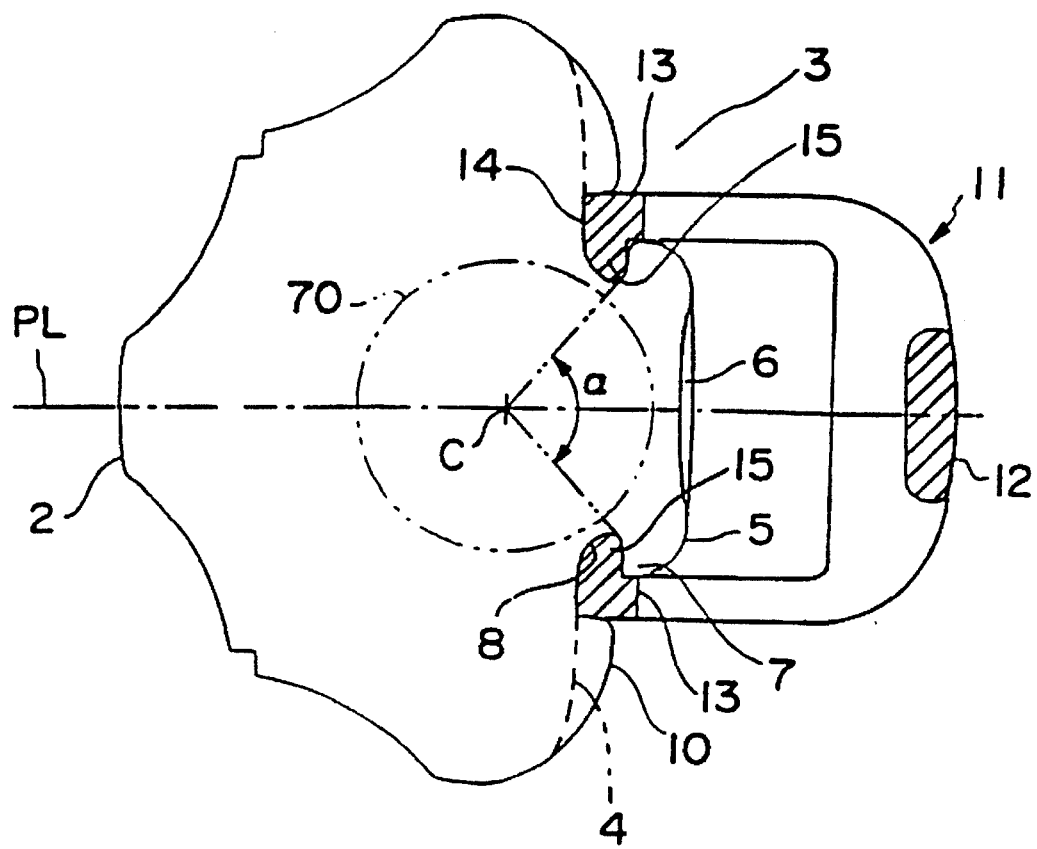
FIG. 47 is a view showing a eleventh embodiment of the present invention, which is an enlarged cross sectional view of the joint between a bottle body and a handle.

That is, the opening angle a between both tips of the engaging pieces 15 of the handle 11 when its center is an oriented central axis C of the preform 70 is set to an angle of substantially 90° as shown in FIG. 47.

In this manner, both the engaging pieces 15 fully close to the preform 70 so that a portion of the preform 70 to be formed to the joining portion of the bottle body 1 contact the tip portions of the engaging pieces 15 at the beginning of the molding, thereby contacting the engaging pieces 15 in a state in which the preform 70 is not fully deformed, that is, in a state of having large thickness and good formability.

As a result of this, though a partial oriented deformation is performed to the engaging pieces 15 after contacting, the joining portion can be molded to have relatively large thickness and good formability.

The joining portion of the bottle body 1 thus molded to have relatively large thickness can have high mechanical strength so that the joint between the joining portion of the bottle body 1 and the joining portion of the handle 11 becomes strong and stable.

Further, the preform 70 can smoothly expand and flow to an engaging surface side engaging with the bulge pieces 7 so that the oriented molding of the bulge pieces 7 and the engaging grooves 8 of the bottle body 1 is smoothly and securely accomplished, thereby molding the bottle body 1 having strong joining force at the joining portion thereof.

The method for molding by setting the relative positioning between the preform 70 and the handling 11 as the insert as mentioned above may employed for molding the bottle with a handle according to any other embodiments from first embodiment to the tenth embodiment described above.

INDUSTRIAL APPLICABILITY

As mentioned above, in the synthetic resin bottle with a handle according to the present invention, the bottle body and the handle are quite strongly combined, not only before but also after the content is filled in the bottle body, the user can carry the bottle and pour the content quite safely and securely. Therefore, the synthetic resin bottle with a handle according to the present invention is useful as a container for accommodating daily necessities such as liquid detergent, face lotion and the like, liquid foods such as cooking oil, sauce and the like, and liquid material for industrial use such as industrial oil and the like.

We claim:

1. A synthetic resin bottle with a handle comprises:
    a handle having a pair of assembly beams arranged to oppose each other, a handle plate being integrally disposed between both end portions of said assembly beams, and engaging pieces being convexly formed on the inner surfaces of said both assembly beams;
    a bottle body formed by biaxial oriented blow molding with said assembly beams of said handle as an insert and having a body portion, a recessed portion being concavely formed at a rear portion of said body portion, a vertical protruding portion to be inserted between said both assembly beams of said handle as well as supporting protuberances contacting and stopping the outer surfaces of said assembly formed being formed on the bottom surface of said recessed portion, bulge pieces protruding outwardly and extending vertically being formed on both side surfaces of said vertical protruding portions, and engaging grooves into which said engaging pieces of said handle are engaged being each formed between said bulge portions and the bottom surface of said recessed portion.

2. A synthetic resin bottle with a handle as claimed in claim 1 wherein the upper ends of said engaging grooves of said bottle body are stopping ends, and the upper ends of said engaging pieces of said handle are stopped by said stopping ends.

3. A synthetic resin bottle with a handle as claimed in claim 1 wherein said vertical protruding portion has a plurality of reinforcing ribs laterally extending, said reinforcing ribs being disposed on the top wall of said vertical protruding portion.

4. A synthetic resin bottle with a handle as claimed in claim 1 further comprising a bridge disposed between said both assembly beams of said handle.

5. A synthetic resin bottle with a handle comprises:
    a handle having a pair of assembly beams arranged to oppose each other, a handle plate being integrally disposed between both end portions of said assembly beams, engaging pieces being convexly formed on the inner surfaces of said both assembly beams, and a supplementary engaging protruding portion being convexly disposed to said both assembly beams;
    a bottle body formed by biaxial oriented blow molding with said assembly beams of said handle as an insert and having a body portion, a recessed portion being concavely formed at a rear portion of said body portion, a recessed portion being concavely formed at a rear portion of said body portion, a vertical protruding portion to be inserted between said both assembly beams of said handle as well as a supplementary engaging recess portion into which said supplementary engaging protruding portion is engaged being formed on the bottom surface of said recessed portion, bulge pieces protruding outwardly and extending vertically being formed on both side surfaces of said vertical protruding portion, and engaging grooves into which said engaging pieces of said handle are engaged being each formed between said bulge portions and the bottom surface of said recessed portion.

6. A synthetic resin bottle with a handle as claimed in claim 5 wherein said vertical protruding portion has a plurality of reinforcing ribs laterally extending, said reinforcing ribs being disposed on the top wall of said vertical protruding portion.

7. A synthetic resin bottle with a handle as claimed in claim 5 wherein said vertical protruding portion has a plurality of reinforcing ribs laterally extending, said reinforcing ribs being disposed on the top wall of said vertical protruding portion, the depth of said reinforcing ribs being set to 5 or more times of stretch ratio of thickness of said vertical protruding portion.

8. A synthetic resin bottle with a handle as claimed in claim 5 further comprising supporting protuberances contacting and stopping the outer surfaces of said assembly beams of said handle being formed on the bottom surface of said recessed portion of said bottle body.

9. A synthetic resin bottle with a handle as claimed in claim 5 further comprising supporting protuberances contacting and stopping the outer surfaces of said assembly beams of said handle being formed on the bottom surface of said recessed portion of said bottle body, and irregularities laterally extending formed on said supporting protuberances.

10. A synthetic resin bottle with a handle as claimed in claim 5 wherein said handle has a symmetrical structure vertically and laterally.

11. A synthetic resin bottle with a handle as claimed in claim 5 wherein the tip surfaces of said assembly beams of said handle each comprise linear flat surface.

12. A synthetic resin bottle with a handle as claimed in claim 5 further comprising constricted portions formed on a portion, adjacent said supplementary engaging protruding portion, in said engaging pieces of said handle.

13. A synthetic resin bottle with a handle as claimed in claim 5 wherein said supplementary engaging protruding portion of said handle comprises projecting pieces each projecting from the tip surfaces of said assembly beams and said supplementary engaging recess portion of said bottle body comprising engaging recesses each having a bottom and disposed on the bottom surface of said recessed portion.

14. A synthetic resin bottle with a handle as claimed in claim 5 wherein said supplementary engaging protruding portion of said handle comprises projecting pieces each projecting from the tip surfaces of said assembly beams, concave portions being formed on the tip surfaces of said projecting pieces at substantially center thereof, and said supplementary engaging recess portion of said bottle body comprising engaging recesses each having a bottom and disposed on the bottom surface of said recessed portion.

15. A synthetic resin bottle with a handle as claimed in claim 5 wherein said supplementary engaging protruding portion of said handle comprises projecting pieces projecting from the tip surfaces of said assembly beams, the tip ends of said projecting pieces being formed to be expanded portions, and said supplementary engaging recess portion of said bottle body comprising engaging recesses each having a bottom and disposed on the bottom surface of said recessed portion.

16. A synthetic resin bottle with a handle as claimed in claim 5 wherein said supplementary engaging protruding portion of said handle comprise projecting pieces projecting from the tip surfaces of said assembly beams, the tip ends of said projecting pieces being formed to be expanded portions, said supplementary engaging recess portion of said bottle body comprising engaging recesses each having a bottom and disposed on the bottom surface of said recessed portion, and engaging grooves being formed between said expanded portions and said projecting pieces.

17. A synthetic resin bottle with a handle as claimed in claim 5 wherein said supplementary engaging protruding portion of said handle comprise projecting pieces projecting from the tip surfaces of said assembly beams, the tip ends of said projecting pieces being formed to be expanded portions, said supplementary engaging recess portion of said bottle body comprising engaging recesses each having a bottom and disposed on the bottom surface of said recessed portion, engaging grooves being formed between said expanded portions and said projecting pieces, and notches widening the width of said engaging grooves being formed to a portion, opposing said projecting pieces, in said expanded portions.

18. A synthetic resin bottle with a handle as claimed in claim 5 wherein said supplementary engaging protruding portion of said handle comprise projecting pieces projecting from the tip surfaces of said assembly beams and engaging pins projecting from said projecting pieces in the direction opposite to the projecting direction of said projecting pieces, wherein said supplementary engaging recess portion of said bottle body comprise engaging recesses each having a bottom and disposed on the bottom surface of said recessed portion and engaging concave portions disposed on said vertical protruding portion.

19. A synthetic resin bottle with a handle comprises:
   a handle having a pair of assembly beams arranged to oppose each other, a handle plate being integrally disposed between both end portions of said assembly beams and engaging pieces being convexly formed on the inner surfaces of said both assembly beams;
   a bottle body having a body portion, a recessed portion being concavely formed at a rear portion of said body portion, a recessed portion being concavely formed at a rear portion of said body portion, a vertical protruding portion to be inserted between said both assembly beams of said handle being formed on the bottom surface of said recessed portion, bulge pieces protruding outwardly and extending vertically being formed on both side surfaces of said vertical protruding portion, engaging grooves into which said engaging pieces of said handle are engaged being each formed between said bulge portions and the bottom surface of said recessed portion, a protuberance formed in a curved shape being formed on a connecting portion between said recessed portion and said body portion which is the lower edge of said recessed portion, and a vertical groove concavely disposed on said protuberance.

20. A synthetic resin bottle with a handle as claimed in claim 19 wherein said bottle body is formed by biaxial oriented blow molding with said assembly beams of said handle 11 as an insert.

21. A synthetic resin bottle with a handle comprises:
   a handle having a pair of assembly beams arranged to oppose each other, a handle plate being integrally disposed between both end portions of said assembly beams, engaging pieces being convexly formed on the inner surfaces of said both assembly beams, and a recessed portion for receiving user's finger being formed on an upper outer surface of said handle plate;
   a bottle body having a body portion, a recessed portion being concavely formed at a rear portion of said body portion, a recessed portion being concavely formed at a rear portion of said body portion, a vertical protruding portion to be inserted between said both assembly beams of said handle as well as supporting protuberances contacting and stopping the outer surfaces of said assembly formed being formed on the bottom surface of said recessed portion, bulge pieces protruding outwardly and extending vertically being formed on both side surfaces of said vertical protruding portion, engaging grooves into which said engaging pieces of said handle are engaged being each formed between said bulge portions and the bottom surface of said recessed portion.

22. A production method of a synthetic resin bottle with a handle comprises following steps:
   previously forming a handle having a pair of assembly beams arranged to oppose each other, a handle plate being integrally disposed between both end portions of said assembly beams, and engaging pieces being convexly formed on the inner surfaces of said both assembly beams;
   setting said assembly beams including said engaging pieces of said handle as an insert to a mold for blow molding a bottle body;
   molding said bottle body with said mold by biaxial oriented blow molding from a preform; and thereby forming a vertical protruding portion to be inserted between said both assembly beams of said handle, bulge pieces protruding outwardly and extending vertically from both side surfaces of said vertical protruding portion, engaging grooves into which said engaging pieces of said handle are engaged;

wherein said handle is combined to the bottle body at the same time as the molding of said bottle body.

23. A production method of a synthetic resin bottle with a handle as claimed in claim 22 wherein the opening angle between said both engaging pieces of said handle when its center is an oriented central axis of said preform which is a raw material of said bottle body is set to an angle of substantially 90°.

* * * * *